(12) United States Patent
Khidekel et al.

(10) Patent No.: US 10,997,515 B2
(45) Date of Patent: *May 4, 2021

(54) FAST MULTI-STEP OPTIMIZATION TECHNIQUE TO DETERMINE HIGH PERFORMANCE CLUSTER

(71) Applicant: Adxcel Inc., Pleasanton, CA (US)

(72) Inventors: Yuri Khidekel, Lafayette, CA (US); Dmitry Aryshev, Sankt-Peterburg (RU)

(73) Assignee: Adxcel Inc., Pleasanton, CA (US)

( * ) Notice: Subject to any disclaimer, the term of this patent is extended or adjusted under 35 U.S.C. 154(b) by 773 days.

This patent is subject to a terminal disclaimer.

(21) Appl. No.: 15/424,618

(22) Filed: Feb. 3, 2017

(65) Prior Publication Data

US 2018/0225587 A1 Aug. 9, 2018

(51) Int. Cl.
 *G06N 7/00* (2006.01)
 *G06Q 10/04* (2012.01)
 *G06Q 30/02* (2012.01)

(52) U.S. Cl.
 CPC ............. *G06N 7/005* (2013.01); *G06Q 10/04* (2013.01); *G06Q 30/0201* (2013.01)

(58) Field of Classification Search
 CPC ...................................................... G06N 7/005
 See application file for complete search history.

(56) References Cited

U.S. PATENT DOCUMENTS

| | | | |
|---|---|---|---|
| 8,364,519 B1 * | 1/2013 | Basu | G06Q 10/0637 705/7.38 |
| 2006/0212350 A1 | 9/2006 | Ellis et al. | |
| 2007/0156621 A1 * | 7/2007 | Wright | G06Q 30/0254 706/48 |
| 2008/0215417 A1 * | 9/2008 | Young | G06Q 30/0243 705/14.42 |
| 2012/0259702 A1 | 10/2012 | Zhang et al. | |
| 2013/0236002 A1 * | 9/2013 | Jennings | G06Q 10/06393 379/265.12 |
| 2014/0046777 A1 * | 2/2014 | Markey | G06Q 30/02 705/14.66 |

(Continued)

FOREIGN PATENT DOCUMENTS

WO WO-2016046744 A1 * 3/2016 ............. G06N 20/10

*Primary Examiner* — Michael J Huntley
*Assistant Examiner* — Ahsif A. Sheikh
(74) *Attorney, Agent, or Firm* — Lowenstein Sandler LLP

(57) ABSTRACT

A method of machine learning includes performing dimensionality reduction on a parameter space by performing initial tests to determine scores for a plurality of parameter values in the parameter space, determining aggregate scores for a plurality of parameter value combinations, determining a ranking of the plurality of parameter value combinations based on the aggregate scores, and performing cluster analysis on the plurality of parameter value combinations to determine a set having highest aggregate scores. The method further includes performing additional tests, wherein each additional test is for a parameter value combination in the set. For each such parameter value combination, a probability of achieving a key performance indicator (KPI) is computed. Cluster analysis is then performed to determine a first subset of the set having highest probabilities of achieving the KPI. An operation is then performed on the first subset.

26 Claims, 13 Drawing Sheets

(56) References Cited

U.S. PATENT DOCUMENTS

2014/0297400 A1* 10/2014 Sandholm .......... G06Q 30/0243
  705/14.42
2016/0162931 A1* 6/2016 Harik ................. G06Q 30/0254
  705/14.45

* cited by examiner

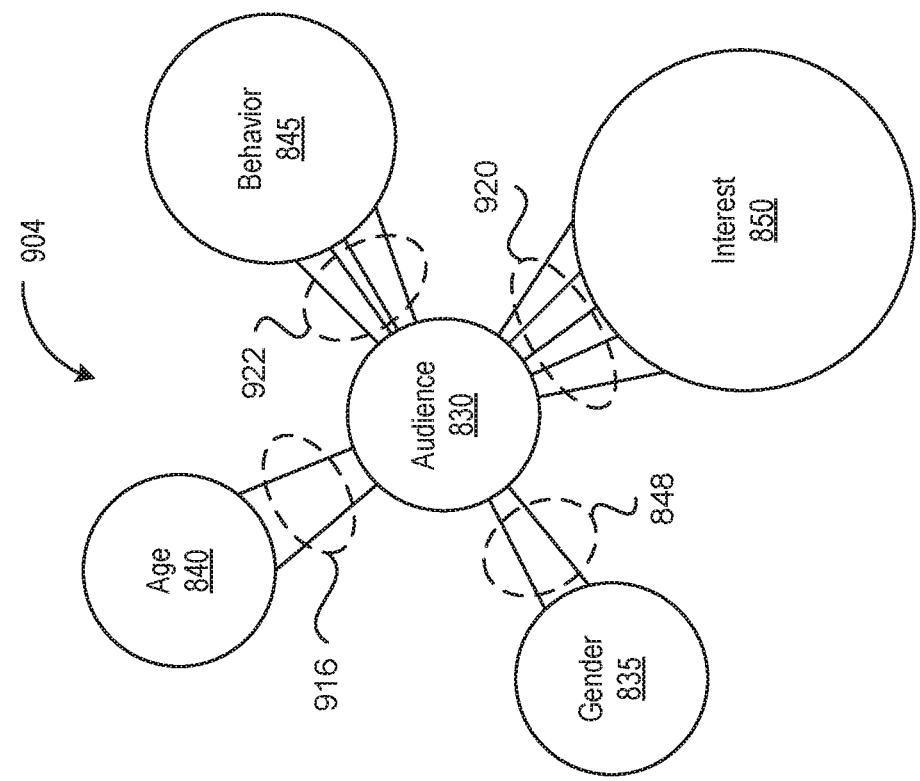
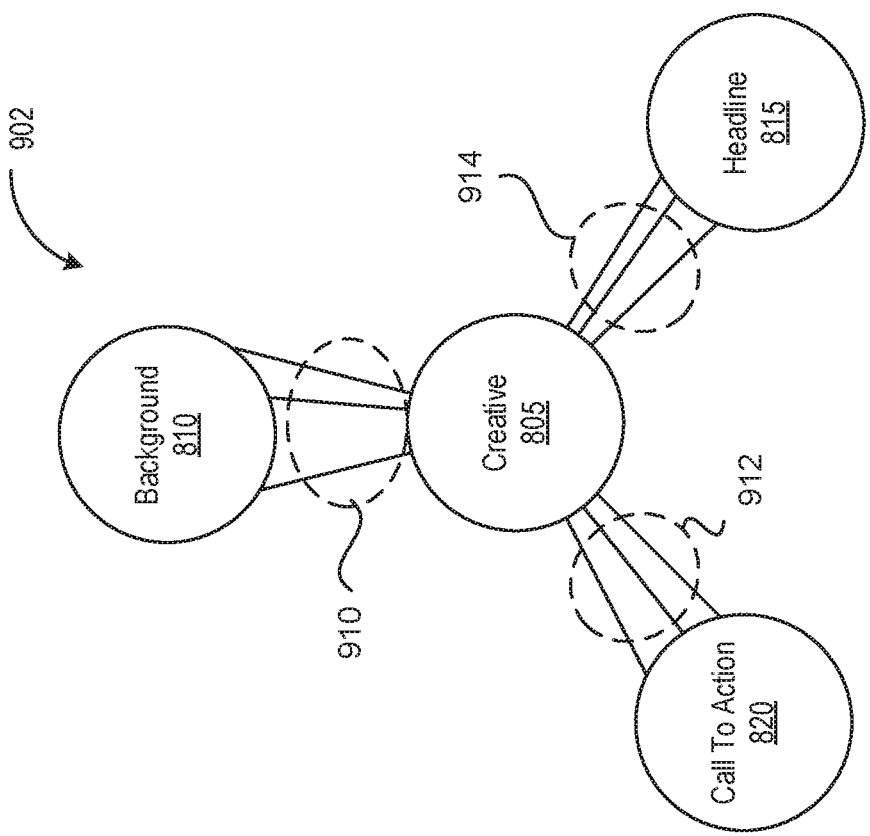
FIG. 9B
FIG. 9A

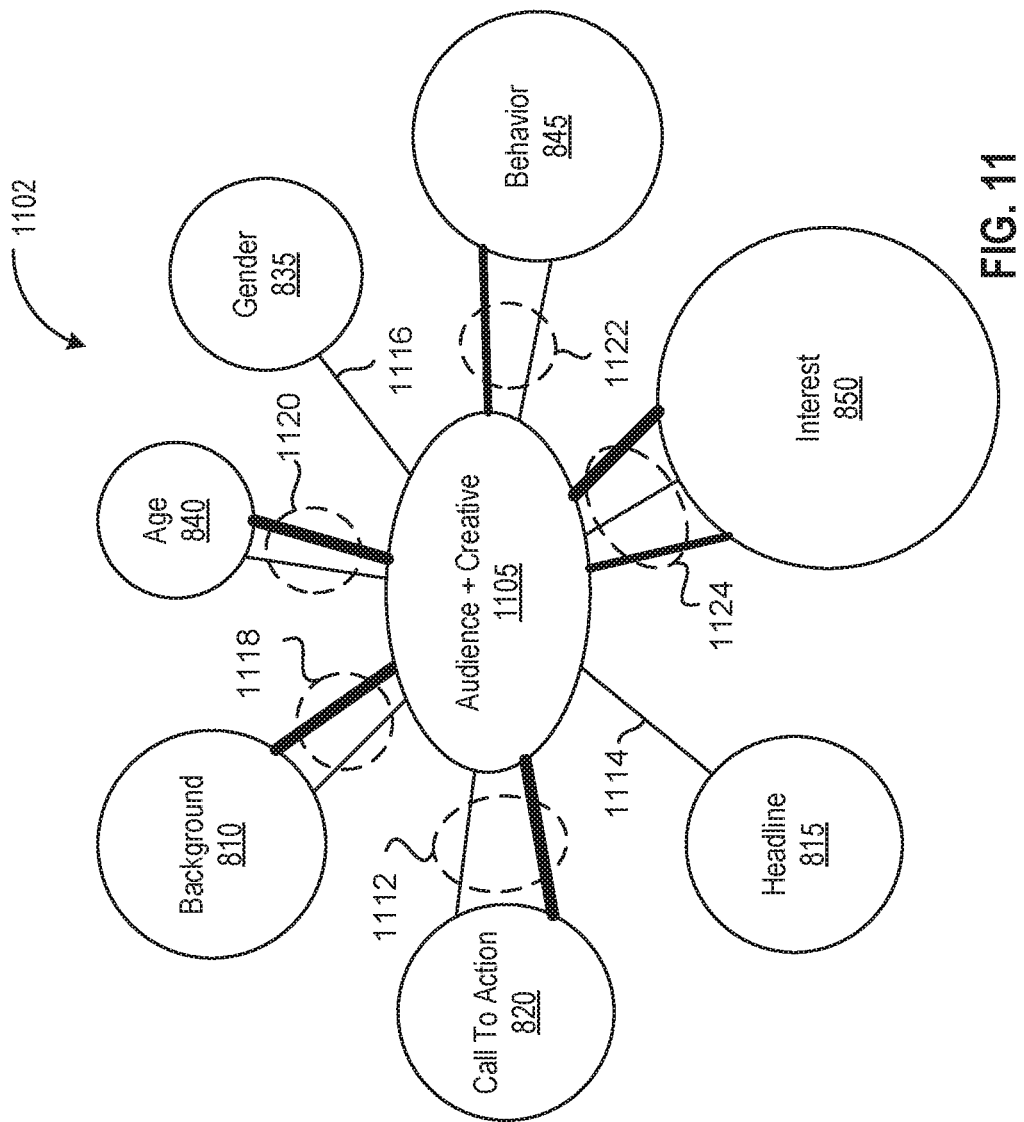

FAST MULTI-STEP OPTIMIZATION TECHNIQUE TO DETERMINE HIGH PERFORMANCE CLUSTER

BACKGROUND

Systems with multiple different parameters that can be combined in many ways suffer from the effect of combinatorial explosion. Combinatorial explosion describes the effect of functions that grow rapidly (e.g., exponentially) as a result of combinatorial considerations. Combinatorial explosion can pose a problem in computing, as there may be insufficient resources (e.g., insufficient memory, processing power, time, etc.) to test every possible unique combination of parameter values and determine an optimal combination of parameter values based on the testing.

BRIEF DESCRIPTION OF THE DRAWINGS

Reference will now be made to the accompanying drawings showing example embodiments of the present application.

FIG. 9A is a diagram illustrating the first portion of the problem space of FIG. 8A after performing dimensionality reduction, in accordance with an embodiment of the present disclosure.

FIG. 9B is a diagram illustrating the second portion of the problem space of FIG. 8B after performing dimensionality reduction, in accordance with an embodiment of the present disclosure.

FIG. 11 is a diagram illustrating optimal parameter value combinations including a combination of the optimal parameter value combinations for the set of creative content elements of FIG. 10A and the optimal parameter value combinations for the set of audience segments of FIG. 10B, in accordance with an embodiment of the present disclosure.

DETAILED DESCRIPTION OF EMBODIMENTS

Figure 1:
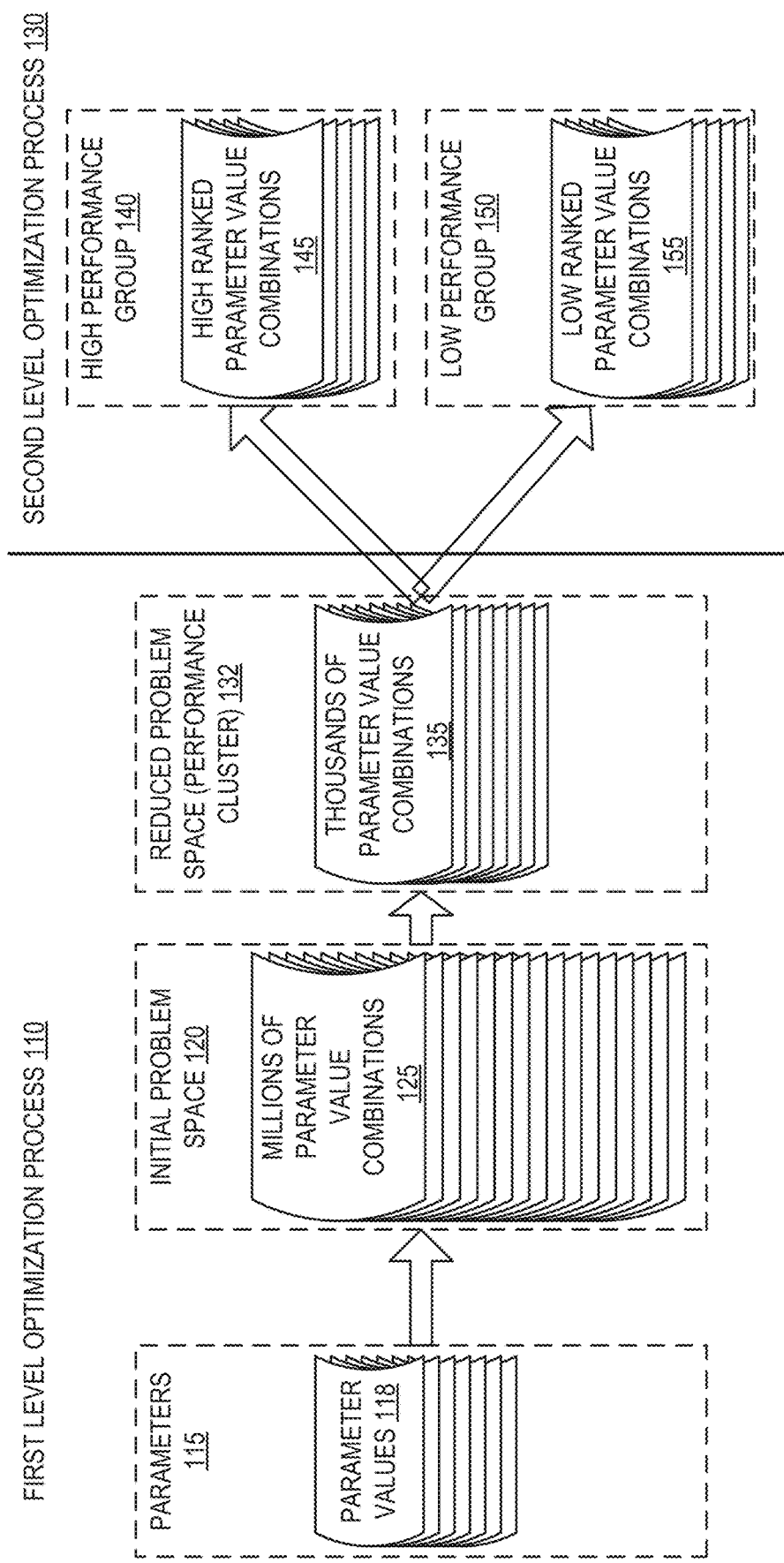
FIG. 1 is a diagram depicting a two-level machine learning optimization process that identifies a set of optimal parameter value combinations while avoiding combinatorial explosion, in accordance with an embodiment of the present disclosure.

Embodiments are directed to a method and system for using machine learning to determine optimal parameter value combinations in a parameter space with minimal resource utilization. The optimal parameter value combinations may be those parameter value combinations that achieve a defined result (e.g., an event associated with a key performance indicator (KPI)) with a minimum usage of resources and/or that have a highest probability of achieving the defined result. The initial parameter space may have millions to billions of different possible unique parameter value combinations, and individual testing of each parameter value combination for achieving the defined result or KPI may be impracticable. Embodiments described herein enable the one or more optimal parameter value combinations to be identified without separately testing every possible parameter value combination, thereby avoiding combinatorial explosion and minimizing resource utilization. In some implementations, optimization of a non-linear function expressing probability of realizing a KPI in a discrete large parameter space is achieved through decomposition of an initial probability function with a dimension greater than one into a combination of single dimension functions.

In one embodiment, a processing device performs the machine learning task of dimensionality reduction on a parameter space. The dimensionality reduction is achieved by performing operations I-IV as follows. In operation I, one or more initial tests are performed to determine scores for a plurality of parameter values in the parameter space. In operation II, the processing device determines, based on a result of the one or more initial tests, aggregate scores for a plurality of parameter value combinations. In operation III, the processing device determines a ranking of the plurality of parameter value combinations based on the aggregate scores. The ranking of the plurality of parameter value combinations based on the aggregate scores correlates to a ranking of the plurality of parameter value combinations based on a probability that an event associated with a key performance indicator (KPI) will be achieved. In operation IV, the processing device performs the machine learning task of cluster analysis on the plurality of parameter value combinations based at least in part on the ranking to determine a set of parameter value combinations having highest aggregate scores from the plurality of parameter value combinations.

Subsequently, the processing device performs a plurality of additional tests, wherein each additional test of the plurality of additional tests is for a parameter value combination in the set of parameter value combinations. The processing device then computes, for each parameter value combination of the set of parameter value combinations, based on an associated additional test of the plurality of additional tests, a probability of the parameter value combination achieving the event associated with the KPI. The processing device performs cluster analysis on the set of parameter value combinations to determine a first subset of the set of parameter value combinations having highest probabilities of achieving the event associated with the KPI. The processing device may then perform an operation for the first subset. In an example, the plurality of parameter values may comprise parameter values for a plurality of audience segments and additional parameter values for a plurality of creative content elements. The operation in the example may be sending creative content indicated in parameter value combinations from the first subset to audience segments indicated in corresponding parameter value combinations in the first subset.

In one embodiment, a processing device defines a parameter space comprising a plurality of parameter value combinations of a plurality of parameter values for a plurality of parameters, wherein the parameter space has a dimension that is greater than one. The processing device performs dimensionality reduction on the parameter space based on performing the following operations. The processing device generates a plurality of single dimension functions, wherein each single dimension function is for a single parameter value of the plurality of parameter values. The processing device performs one or more tests for the plurality of parameter values. The processing device computes, based on results of the one or more tests, a score for each parameter value of the plurality of parameter values, wherein the score is associated with one of the single dimension functions. The score may be a solution of the single dimension function.

The processing device computes, for each parameter value combination of the plurality of parameter value combinations, an aggregate score that is based on combining scores of the plurality of parameter values in the parameter value combination. The processing device determines a first ranking of the plurality of parameter value combinations based on the aggregate scores, wherein the first ranking correlates to a second ranking of the plurality of parameter value combinations based on a probability that an event associated with a key performance indicator (KPI) will be achieved. The processing device then performs cluster analysis on the plurality of parameter value combinations based at least in part on the first ranking to select a set of parameter value combinations from the plurality of parameter value combinations. One or more parameter value combinations in the set may have the dimension of the parameter space. The processing device then may generate a file or data structure comprising the set of parameter value combinations.

An ultimate goal may be to solve a first function whose output is one or a set of optimal parameter value combinations that have a maximum probability of achieving a KPI (e.g., for which expenditure of a resource has a maximum probability of achieving an event associated with a KPI). However, to solve the first function, a set of second functions are generated, where each function in the set of second functions is a single dimension function for a single parameter value. Since these functions are single dimension functions, combinatorial explosion is prevented. The scores that are computed from the set of second functions are combined to form aggregate scores. These aggregate scores do not represent probability of achieving the KPI. However, notably a ranking of the aggregate scores correlates to a ranking of the probability of achieving the KPI for the first function. Accordingly, the number of optimal parameter value combinations may be determined without testing every parameter value combination (or even without testing any of the parameter value combinations) in embodiments. This can provide a huge savings in memory resources, processing resources, monetary resources, time resources, and so on.

Referring now to the figures, FIG. 1 is a diagram depicting a two-level machine learning optimization process that identifies a set of optimal parameter value combinations while avoiding combinatorial explosion, in accordance with embodiments of the present disclosure. There are many applications that benefit from optimization for creative content to an optimum audience. This may include matching a particular combination of creative content elements to an audience having a particular combination of characteristics. Such optimization of creative content to audiences having particular characteristics may be applicable to numerous applications, including content delivered within an application (e.g., messages pertaining to a game that are delivered inside of the game), advertising content delivered to potential customers (e.g., display advertising), content presented on websites and landing pages, mobile application content, multimedia content such as videos and and/or audio, and so on.

A function for a probability of achieving a key performance indicator (KPI) may include multiple parameters 115, where each of the parameters may have one or more different parameter values 118. The parameters to include in the parameter space may be determined based on prior knowledge, based on prior data, based on look-alike modeling of prior data, or based on other techniques. In examples the dimensionality of the parameter space may be between 3 and 7, inclusive. For example, a 3 dimensional parameter space may be S={Ca, Ch, Cc}, a 4 dimensional parameter space may be S={D, I, B, C}, a 5 dimensional parameter space may be S={Da, Dg, I, B, C}, a 6 dimensional parameter space may be S={D, I, B, Ca, Ch, Cc}, and a 7 dimensional parameter space may be S={Da, Dg, I, B, Ca, Ch, Cc}.

Achieving the KPI may include achieving an event associated with the KPI. The event may be a product or service purchase, an installation of an application, a click on a link or image, a user response, and so on. A KPI may be tied to usage of a particular resource, such as a monetary resource, a time resource, a memory resource, a computing resource, etc. The function for achieving the KPI may be expressed as a probability of achieving the event associated with the KPI after expenditure of a particular resource. For example, the probability may be expressed as the probability of achieving a sale, an installation, a click, etc. per dollar spent.

An initial problem space 120 may be made up of a huge number of parameter value combinations of the parameter values 118 for the parameters 115. For example, the huge number of parameter value combinations may be hundreds of thousands of parameter value combinations, millions of parameter value combinations 125 as shown, hundreds of millions of parameter value combinations, billions of parameter value combinations, or an even greater number of parameter value combinations. Each of the parameter value combinations in the initial problem space 120 is a unique combination of the parameter values 118.

In an example, the parameters may include multiple audience segment parameters, multiple creative content element parameters, or a combination of audience segment parameters and creative content element parameters. Audience segment parameters may include, for example, parameters for a gender audience segment, an age audience segment, an interests audience segment and/or a behavior audience segment. More or fewer audience segment parameters may also be used.

The gender audience segment may have the parameter values of male and female. The age audience segment may include different parameter values for different age ranges. For example, a first age parameter value may be for 18-20 year olds, a second age parameter value may be for 21-25 year olds, a third age parameter value may be for 26-30 year olds, and so on. Ages from 1-100 or narrower age ranges may also be divided into different age ranges. An interests audience segment parameter may include different parameter values for different possible interests. Examples include photography, woodworking, pets, outdoors, sports, reading, shopping, gaming, fishing, and so on. Hundreds or thousands of different interests parameter values may be possible. The behavior audience segment parameter may include different parameter values for different user behaviors. Examples of behaviors include a relationship status parameter (e.g., a parameter value for single, a parameter value for married, a parameter value for long term relationship, etc.), a sexual preference parameter (e.g., with a separate parameter value for each preference), a language proficiency parameter (e.g., with different parameter values for each language), and so on. If there are, for example, 16 different demographics parameter values, 100 different interests parameter values, and 100 different behavior parameter values, then there are 16×100×100=160,000 different unique audience segment combinations.

Creative content element parameters may include a background image parameter, a message parameter (also referred to as a headline parameter), a call-to-action parameter, and so on. More or fewer creative content element parameters may also be used. There may be a separate background parameter value for each background image, a separate message parameter value for each message and a separate call-to-action parameter value for each call-to-action. If there are, for example, 10 background elements, 10 different messages and 10 different calls to action, then there are 10×10×10=1000 different unique creative content combinations. Finding an optimal parameter value combination that includes the creative content element combinations and the audience segment combinations from the above examples yields 160,000,000 different unique possibilities. Testing of all possible parameter value combinations for maximum probability of achieving a KPI is impracticable using standard techniques. For example, if an advertising campaign were to test each of the possible parameter value combinations, and $10.00 was required to test a single parameter value combination, then the cost to test all of the parameter value combinations and determine if a given combination satisfies a KPI threshold would be $1.6 billion dollars.

The first level optimization process 110 includes a sequence of operations that achieves dimensionality reduction of the initial problem space 120 without testing each of the potentially millions of parameter value combinations 125. Specifically, the first level optimization process 110 uses tailored machine learning techniques of data mining, dimensionality reduction and cluster analysis to identify the top performing parameter value combinations and generate a reduced problem space 132 (also referred to as a performance cluster) that includes orders of magnitude fewer parameter value combinations than the initial problem space 120. For example, the initial problem space 120 of millions of parameter value combinations 125 may be reduced to the reduced problem space 132 of thousands of parameter value combinations 135. The systems and methods for performing the first level optimization process 110 are described below with reference to the remaining figures.

In one embodiment, the plurality of parameters comprise audience segment parameters including a gender audience segment set, an age audience segment set, an interests audience segment set and a behavior audience segment set and creative content parameters including a background image creative content element set, a message creative content element set, and a call to action creative content element set. For this combination of parameters, the parameter space (also referred to as the initial problem space 120) is defined as S={Da, Dg, I, B, Cb, Ch, Cc}, where Da is an element in the age audience segment set, Dg is an element in the gender audience segment set, I is an element in the interests audience segment set, B is an element in the behavior audience segment set, Cb is an element in the background image creative content element set, Ch is an element in the message creative content element set, and Cc is an element in the call to action creative content element set. A function for finding a probability of achieving a KPI for the problem space may be defined as P=F(D, I, B, C)=F(Da, Dg, I, B, Cb, Ch, Cc), where P is the probability of achieving the KPI. In an example, Da may be divided into 8 age ranges, Dg may have the parameter values of male and female, I may have 100 parameter values, B may have 100 parameter values, and Cb, Ch and Cc may have 10 parameter values each. In this example, the initial problem space is 2×8×100×100×1000=160,000,000 parameter value combinations. Note that the above example assumes that no parameter value combinations include more than one parameter value for each parameter (e.g., that a user cannot be both male and female). However, the parameter values for some parameters such as interests and behaviors may not be mutually exclusive. For example, a user may have multiple interests and/or multiple behaviors. Accordingly, the number of unique parameter value combinations may be even higher than as set forth above in embodiments.

Embodiments may also be extended to any other combination of parameters, and may include the addition of one or more of user history parameters, creative content sequences, distribution medium parameters, placement parameters, and so on. Any or all of these parameters may be used instead of or in addition to one or more of the above mentioned parameters of demographics, interests, behavior, and creative content while still avoiding the problem of combinatorial explosion. Some examples are provided below.

In some embodiments, the parameters may include a user history audience segment parameter. Each user history parameter value may include a particular past user action, type of user action, collection of user actions, preference, or collection of preferences. Examples include clicks on particular content, responses to messages, user settings, and so on. Accordingly, creative content may be tailored to users based on their past actions, preferences and settings in addition to other characteristics of the users such as demographics, interests, behaviors, and so on. This will allow optimizing creative content for the users with certain type of prior known experience.

In one embodiment, the plurality of parameters comprise a set of demographics audience segments, a set of interests audience segments, a set of behavior audience segments, a set of creative content elements, and a set of user history audience segments that define the parameter space as S={D, I, B, C, UH}, where D is an element in the set of demographics audience segments, I is an element in the set of interests audience segments, B is an element in the set of behavior audience segments, C is an element in the set of creative content elements, and UH is an element in the set of user history audience segments. The demographics audience segments set may be divided into an age set and a gender set, and the creative content elements set may be divided into a background set, a message set and a call to action set in some implementations.

In some embodiments, the parameters may include a distribution medium parameter and a placement parameter. The distribution medium parameter may have a different parameter value for each distribution medium. Examples of distribution medium parameter values include emails, text messages, banners, in application displays, web page displays, displays on videos, and so on. For example, the identifier (ID) of a publisher, web site, application, etc. may be another parameter that may be tracked in addition to or instead of audience segment parameter values and creative content parameter values. Placement parameter values represent placement in a distribution medium, such as a physical location in a distribution medium (e.g., at a top, bottom, center, side, etc. of the distribution medium), a temporal placement in the distribution medium for distribution mediums such as audio and video (e.g., before the audio or video, in the middle of the audio or video, after the audio or video, etc.), and so on. The distribution medium plus the placement in the distribution medium may define a visual space for the set of creative content elements. Use of the distribution medium and placement parameters enables for optimization of placement of creative content based on the distribution medium in addition to optimization of the audience and of the creative content.

In one embodiment, the plurality of parameters comprise a set of demographics audience segments, a set of interests audience segments, a set of behavior audience segments, a set of creative content elements, a set of distribution mediums, and a set of placements of a creative content element from the set of creative content elements in a distribution medium of the set of distribution mediums that define the parameter space as S={D, I, B, C, A} or S={D, I, B, C, A, P}, where D is an element in the set of demographics audience segments, I is an element in the set of interests audience segments, B is an element in the set of behavior audience segments, C is an element in the set of creative content elements, A is an element in the set of distribution mediums, and P is an element in the set of the placements. A+P defines a visual space for the set of creative content elements. The demographics audience segments set may be divided into an age set and a gender set, and the creative content elements set may be divided into a background set, a message set and a call to action set in some implementations.

In some embodiments, creative content elements may be generated as one or more sequences of creative content elements. A sequence of creative content elements may include a first creative content element (or combination of creative content elements), a second creative content element (or combination of creative content elements) that is only provided to a recipient after the first creative content element (or combination of creative content elements) is provided to the recipient, a third creative content element (or combination of creative content elements) that are only presented to the recipient after the second creative content element (or set of creative content elements) is presented to the recipient, and so on. Accordingly, if the same user sees the sequential creative content n times, then he or she will see the nth element of the sequence. The sequence of creative content elements may form a story that is presented to a user. This provides a gradual progression of creative content presented to a user to maintain a user's interest and/or tell a story.

In one embodiment, the audience segments comprise a set of demographics audience segments, a set of interests audience segments, and a set of behavior audience segments. The audience segments plus the sequence of creative content elements define the parametric space as S={D, I, B, $C_{S(N)}$}, where D comprises an element in the set of demographics audience segments, I comprises an element in the set of interests audience segments, B comprises an element in the set of behavior audience segments, and $C_{S(N)}$ comprises a sequence of N creative content elements, where $Cs_N$={$Cs_1$, $Cs_2$, ..., $Cs_N$}–N sequences of creative content elements. N is an integer greater than 1. The demographics audience segments set may be divided into an age set and a gender set, and the creative content elements set may be divided into a background set, a message set and a call to action set in some implementations. Each $Cs_N$ may be a combination of background, message and call to action parameter values.

After the first level optimization process 110 has been performed to reduce the initial problem space into the reduced problem space 132, the second level optimization process is performed. The first level optimization process 110 identifies those parameter value combinations that have the highest probability of achieving one or more KPIs, but does not actually determine such probabilities of achieving the KPI. Accordingly, the second level optimization process 130 performs tests on each of the parameter value combinations in the reduced problem space 132 to determine a probability of achieving the KPI for each of these parameter value combinations. Thus, the first level optimization process 110 may provide a rough optimization estimate, and the second level optimization process 130 may provide a precise optimization. In an example, the function P=F(D, I, B, C) or P=F(Da, Dg, I, B, Cb, Ch, Cc) may be solved for each parameter value combination to determine the probability of achieving the KPI for that parameter value combination. Once the probabilities of achieving the KPI for the parameter value combinations in the performance cluster are determined, these parameter value combinations may be ranked based on probability of achieving the KPI and subdivided into a high performance group 140 and a low performance group 150. The high performance group 140 may include high ranked parameter value combinations 145 that have a higher probability of achieving the KPI. The lower performance group 150 may include low ranked parameter value combinations 155 that have a lower probability of achieving the KPI.

It should be noted that the probabilities of parameter value combinations achieving the KPI are dynamic, and not static. Accordingly, the probabilities may change over time, and the parameter value combinations included in the high performance group 140 and the low performance group 150 may also change over time. Reinforcement learning may be performed to effectuate these changes. The systems and methods for performing the second level optimization process 130 are described below with reference to the remaining figures.

Figure 2:
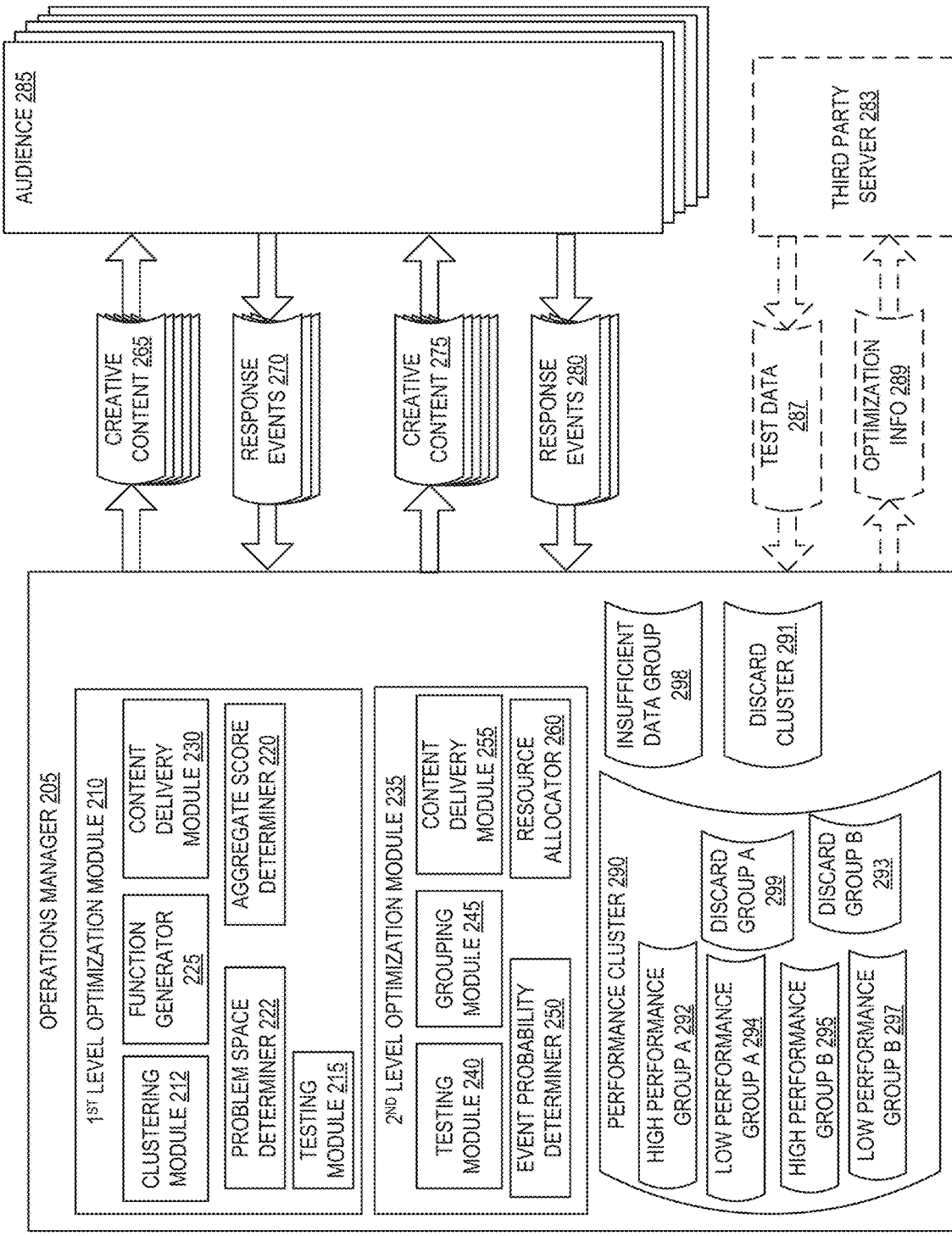
FIG. 2 is a block diagram of an operations manager that performs machine learning operations to determine a performance group from a problem space, in accordance with an embodiment of the present disclosure.

FIG. 2 is a block diagram of an operations manager 205 that performs machine learning operations to determine a performance group from a problem space, in accordance with an embodiment of the present disclosure. The operations manager 205 may execute on one or more server computing devices (not shown), each of which may include a physical machine and/or a virtual machine hosted by a physical machine. The physical machine may be a rackmount server, a desktop computer, or other computing device. In one embodiment, the server computing devices can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device executing the operations manager 205 may be connected to a network (not shown). The network may be a public network (e.g., the Internet), a private network (e.g., an intranet), or a combination of public networks and private networks. Computing devices (not shown) of an audience 285 may additionally be connected to the network. The audience 285 may include millions of households or individuals. These individuals may be users of computing devices that execute web browsers accessing web pages. For example, web browsers of the audience 285 may access social network services such as LinkedIn®, Facebook®, Google Plus®, may access online games, may access commerce web sites, may access search engines, may access online services, and so on. The individuals that make up the audience 285 may additionally or alternatively include users of applications executing on computing devices, where the applications access remote servers via the network. Examples of such applications include games, social networking applications, productivity applications, news applications, and so on. The computing devices may include mobile computing devices such as tablet computers, mobile phones, laptop computers, portable game consoles, and so on. The computing devices may additionally or alternatively include traditionally stationary computing devices such as desktop computers, server computers, home set top boxes, game consoles, and so on.

The operations manager 205 may generate creative content 265, 275 and send the content to the audience 285 via the network. The creative content 265 may be a combination of one or more creative content elements. For example, the operations manager 205 may generate creative content 265, 275 and send that content over the network to the computing devices used by the audience 285. The creative content 265, 275 may then be presented to the audience 285 via the web browser or other application executing on the computing devices used by the audience 285. For example, the creative content 265, 275 may be advertisements, promotional material, notifications, or other messages. Some portion of the audience 185 may then perform response events 270, 280 responsive to receiving the creative content 265. These response events 270, 280 may include clicking on a link, image or advertisement, purchasing a product or service, installing an application, or other action. One or more KPIs may be defined, where each of the KPIs may be associated with a particular type of response event 270, 280. For example, KPIs may be defined for clicks, purchases, installs, and so on. A goal of the operations manager 205 may be to increase or optimize the number of response events 270, 280 associated with a KPI that occur in response to delivery of creative content 265, 275. For example, a goal of the operations manager 205 may be to maximize audience response per spent dollar.

In one embodiment, the operations manager 205 includes a first level optimization module 210 that performs a first level optimization process and a second level optimization module 235 that performs a second level optimization process. Alternatively, the first or second level optimization modules may be omitted, the functionality of the first and second optimization modules may be combined into a single module, or the functionality of one or both of the optimization modules may be divided into additional modules.

First level optimization module 210 may include a clustering module 212, a problem space determiner 222, a function generator 225, a content delivery module 230, a testing module 215, and an aggregate score determiner 220. Problem space determiner 222 may determine the parameters of the problem space to be optimized. Each parameter may include two or more possible parameter values. For example, parameters may include one or more of an age parameter, a gender parameter, an interests parameter, a behavior parameter, a user history parameter, a distribution medium parameter, a placement parameter, a creative content background parameter, a creative content message parameter, a creative content call to action parameter, one or more creative content sequence parameters, and/or other parameters. Each of these parameters may include a few to many parameter values. A problem space (also referred to as an optimization space) for the parameters may be the set of all possible parameter value combinations of the parameter values for the determined parameters.

Once the problem space is defined, function generator 225 may determine a probability function that represents a probability of achieving a KPI for the parameter value combinations in the problem space. An example probability function may be P=F(D, I, B, C) or P=F(Da, Dg, I, B, Cb, Ch, Cc).

It may be impracticable to solve the probability function for all of the parameter value combinations in the problem space. Accordingly, in embodiments the function generator 225 may generate a different single dimension function for each discrete parameter value used to form the problem space. For example, a gender parameter may have a male parameter value and a female parameter value. A first single dimension function (e.g., $S_{male}=G(Dg=male)$) may be generated for the male parameter value and a second single dimension function (e.g., $S_{female}=G(Dg=female)$) may be generated for the female parameter value. In a further example, an age parameter may include 8 different age ranges, and function generator 225 may generate a separate single dimension function for each of the age ranges.

Testing module 215 may generate creative content 265. The creative content 265 may include multiple random or deliberate combinations of creative content elements (e.g., of backgrounds, messages and calls to action). The creative content 265 may then be sent by content delivery module 230 to segments of the audience 285 that have random or deliberate audience segment parameters. Testing module 215 may keep track of the parameter value combinations associated with each of the deliveries of creative content 265 to end users in the audience 265. For each delivery of creative content 265 to an end user in the audience 285, content delivery module 230 determines whether delivery of the creative content to the end user resulted in a desired response event 270 associated with a KPI and may report this information to testing module 215.

Testing module 215 generates statistics for each parameter value based on the delivered creative content 265 and the response events 270. To be statistically significant, at least a threshold number of audience impressions should be achieved for each parameter value. The threshold may be, for example, 10K impressions, 100K impressions, or another number of impressions. For example, a threshold of 100K impressions may be used for assessing a KPI associated with purchases of a good or service.

A test performed by testing module 215 may include generation and delivery of multiple different creative contents, where each different creative content item may include a unique combination of creative content elements. A test may be performed over a time period. An overall optimization test may be divided into individual parameter value tests, where each parameter value test tests for a particular parameter value. Data may be shared between individual parameter value tests.

In an example, a first parameter value test may be based on a first plurality of data points, where each data point is for a particular impression having a particular parameter value combination. Each data point may include the first parameter value and one or more additional parameter values. The one or more additional parameter values are ignored for the first parameter value test so that a score determined from the first parameter value test is based solely on the first parameter value. A second parameter value test may be based on a second plurality of data points. Each data point in the second plurality of data points includes the second parameter value and one or more other parameter values. Some of the data points from the first plurality of data points may also be in the second plurality of data points. Such data points would include the first parameter value and the second parameter value. The one or more other parameter values in the plurality of data points, including the first parameter value, are ignored for the second parameter value test so that a score determined from the second parameter value test is based solely on the second parameter value.

As testing continues and results are returned, testing module 215 may adjust parameters of the test to ensure that a statistically significant amount of data is generated for each parameter value. In other words, testing module 215 may balance traffic for specific parameter values. For example, testing module 215 may determine that a threshold number of impressions have been reached for a male parameter value but the threshold number of impressions have not been reached for a female parameter value. Testing module 215 may then direct content delivery module 230 to increase an amount of additional creative content 265 that is delivered to females and to reduce an amount of additional creative content 265 that is delivered to males.

Once a statistically significant amount of data is received for a parameter value, testing module 215 determines a score that correlates to a probability of that parameter value achieving the KPI based on the number of response events 270 that were associated with that parameter value. Computing the score may include solving the single dimension function for the parameter value that was determined by the function generator 225. Testing module 215 may generate a normalized score by dividing a total number of response events 270 associated with a parameter value by the number of creative contents having that parameter value that were viewed by the audience 285 (referred to as impressions). Accordingly, to compute the score for a parameter value, testing module 215 may determine the score for a parameter value, testing module 215 may determine the total number of uses or impressions for the parameter value, determine the number of instances of a response event that occurred for the parameter value, and determine a value indicative of a ratio of the number of instances of the event to the total number of uses or impressions. The score for a parameter value represents the probability of achieving a KPI for that parameter value if the assumption is made that no other parameters affect the probability of achieving the KPI. Accordingly, the score does not actually represent the true probability of achieving the KPI.

Notably, a single creative content delivery or single impression (having a particular parameter value combination) may be used for computing the scores of multiple different parameter values. For example, a single content delivery may include the parameter value combination of Dg=female, Da=18-24 years old, I=pet lover, B=single, Cb=background image 1, Ch=message 1, Cc=call to action 1. This single content delivery or impression, and a response event (or lack thereof) associated with this single content delivery or impression, may be used in computing the single dimension functions associated with the female parameter value, the 18-24 year old parameter value, the pet lover parameter value, the single parameter value, the background image 1 parameter value, the message 1 parameter value and the call to action 1 parameter value.

A parameter space has orders of magnitude fewer parameter values than parameter value combinations. For example, in a previous example provided above the parameter space was S={Da, Dg, I, B, Cb, Ch, Cc}, where Da had 8 parameter values, Dg had 2 parameter values, I had 100 parameter values, B had 100 parameter values, Cb had 10 parameter values, Ch had 10 parameter values, and Cc had 10 parameter values. Accordingly, this parameter space has a size of M=Count({Da}x{Dg}x{I}x{B}x{Cb}x{Ch}x{Cc})=160 million parameter value combinations. However, this same parameter space has a number of unique parameter values of N=Count({Da}+{Dg}+{I}+{B}+{Cb}+{Ch}+{Cc})=240 parameter values.

By solving for 240 single dimension functions rather than for 160 million probability functions, the number of impressions that are needed to complete testing is greatly reduced. For example, to have statistically significant data on 160 million probability functions, where a minimum threshold for statistical significance is 10K impressions, a minimum number of 1,600,000,000,000 impressions are necessary. By contrast, statistically significant data on 240 single dimension functions may be achieved with only 2,400,000 impressions. This may be further reduced because a single impression may be associated with multiple different parameter values. Accordingly, the total number of impressions that can achieve a statistically significant amount of data for each of 240 parameter values may be as low as 1,000,000 impressions. If the cost of an impression is 1$ per 1000 impressions, then the cost of solving for the single dimension functions in the above example may be $1000, as opposed to a cost of $1.6 billion for solving all of the multi-parameter functions in the parameter space.

Aggregate score determiner 220 generates a different aggregate score for each parameter value combination in the parameter space. The aggregate score for a parameter value combination may be a combination of the discrete scores of each parameter value in the parameter value combination, and may be computed as a composite function of the single dimension functions associated with the parameter values in the parameter value combination. In one embodiment, the aggregate score for a parameter value combination is a linear combination of the scores for each of the parameter values (as determined from the solution of the single dimension function associated with that parameter value) in that parameter value combination. The single dimension functions generated for the parameter values in the parameter space may be represented as Gn(x), where x∈{D, I, B, C}. Assuming that the functions Gd(D), Gi(I), Gb(B) and Gc(C)

are independent, we can calculate the function G(D, I, B, C)≈Gd(D)+Gi(I)+Gb(B)+Gc(C) for each parameter value combination.

Clustering module 212 ranks the parameter value combinations based on their associated aggregate scores. This may include generating a list or table that includes all of the parameter value combinations ordered in accordance with their ranking. As discussed above, the individual scores do not provide an actual probability of achieving a KPI for a parameter value. Similarly, the aggregate scores also fail to provide an actual probability of achieving a KPI for a parameter value combination. However, an unexpected result was reached where a ranking of the parameter value combinations based on the aggregate scores correlates to a ranking of the parameter value combinations based on the actual probability of the parameter value combination achieving the KPI. The ranking based on the aggregate scores may be the same as or similar to the ranking based on the probability of achieving the KPI. For example, if a particular parameter value combination has a highest aggregate score, then it may be determined that this particular parameter value combination also has the highest probability of achieving the KPI.

Clustering module 212 then performs cluster analysis on the ranked parameter value combinations to select a performance cluster 290 (or multiple performance clusters) that includes some reduced number of parameter value combinations having highest ranks. Those parameter value combinations that do not qualify for the performance cluster 290 (or for multiple performance clusters) may be included in a discard cluster 291 (or in one of multiple discard cluster). Performing the cluster analysis may include, for example, determining an average (or median) aggregate score and determining a rank of a parameter value combination having the average (or median) aggregate score. For each parameter value combination, a distance in ranking from the rank of the parameter value combination having the average or median aggregate score may be determined. Those parameter value combinations that are ranked higher than the parameter value combination with the average or median aggregate score and having a distance from the rank of the parameter value combination having the average or median aggregate score that exceeds a distance threshold may then be determined. Alternatively, or additionally, a difference between the aggregate score and the average or median aggregate score may be determined for each parameter value combination. Those parameter value combinations with aggregate scores that exceed the average or median aggregate score and that have a difference from the average or median aggregate score that exceeds a difference threshold may be selected for inclusion in the performance cluster. Other techniques may also be used to select the performance cluster based on the ranking and/or aggregate scores. The number of members to include in the performance cluster (or multiple performance clusters) may be determined dynamically based on cluster analysis. Alternatively, a fixed number of parameter value combinations may be defined to include in the performance cluster or clusters. In an example, the performance cluster may include about 10,000 parameter value combinations.

All other parameter value combinations in the parameter space that are not in the performance cluster 290 may be discarded, thus greatly reducing the dimension of the optimized parameter space. Given any threshold minimum probability P of achieving the KPI, a subset of parameter value combinations in the parameter space may be found that exceeds the threshold minimum probability. For example, given the problem space S={D, I, B, C} and the function G(D, I, B, C), a set of parameter value combinations for which G(D, I, B, C) exceeds the minimum probability P may be selected. This may define the performance cluster 290 that includes the highest performing combinations of creative elements and audience segments.

Accordingly, instead of directly optimizing for the probability function F of maximizing probability of achieving the KPI, the clustering module 212 optimizes the function G of maximizing aggregate scores that correlate to probability of achieving the KPI. This can be achieved because the function G for a parameter value combination will keep the same ranking or approximately the same ranking as the function F for the same parameter value combination. Thus, if F1 (first combination of parameters) has a higher ranking than F2 (second combination of parameters), then G1 (first combination of parameters) should also have a higher ranking than G2 (second combination of parameters). This enables the first level optimization module 210 to move to a different space than the parameter space, where the different space keeps the same ranking as the parameter space for the parameter value combinations. The actual values between the functions F and the associated functions G are different, but the ranking remains the same or similar.

The second level optimization module 235 performs a second level optimization process from the performance cluster 290 (or clusters) output by the first level optimization module 210. Second level optimization module 235 may include a testing module 240, a grouping module 245, a content delivery module 255, an event probability determiner 250 and a resource allocator 260.

Testing module 240 performs multiple tests to determine the probability for each parameter value combination in the performance cluster(s) 290 of achieving the KPI. Testing module 240 may perform a different test for each such parameter value combination. Each test may include delivery of a threshold number of creative content items having a particular combination of creative content elements to members of the audience 285 having a particular combination of audience segment parameter values. The threshold may be, for example, 10K impressions, 50K impressions, 100K impressions, or some other number of impressions. Content delivery module 255 sends the creative contents 275 for each of the tests to the designated audience segments (having designated audience segment parameter values), resulting in impressions. Content delivery module 255 receives response events 280 responsive to some portion of the impressions.

Testing module 240 generates statistics on the number of impressions and the number of response events for each tested parameter value combination. Once a statistically significant amount of data is obtained for a particular parameter value combination in the performance cluster 290, event probability determiner 250 determines a probability that the particular parameter value combination will achieve the KPI. For the example of the parameter space S={D, I, B, C}, this may include solving the function P=F(D, I, B, C) for the particular parameter value combination.

Grouping module 245 divides the parameter value combinations from the performance cluster 290 into different groups (e.g., using cluster analysis). In one embodiment, the grouping module 245 divides the parameter value combinations into groups for a particular KPI based on the probability of the parameter value combinations achieving the KPI. This may include ranking the parameter value combinations based on their determined probabilities of achieving the KPI and then performing cluster analysis. In one embodiment, the parameter value combinations are divided into a high performance group (e.g., high performance group A 292) and a low performance group (e.g., low performance group A 294).

In one embodiment, dividing the parameter value combinations into the high performance group and the low performance group includes determining a threshold probability for inclusion in the high performance group. Then those parameter value combinations having a probability that exceeds the threshold may be included in the high performance group. The threshold may be based on a median probability of achieving the KPI for the performance cluster, the mean probability of achieving the KPI for the performance cluster, or on some other statistical value.

In some embodiments multiple different KPIs may be used. For example, installations, clicks and purchases may all be useful for a particular marketing campaign. Parameter value combinations may have different probabilities of achieving each of the KPIs. Accordingly, the results of a test for a particular parameter value combination may be separately analyzed by testing module 240 for the probability of achieving each KPI.

Grouping module 245 may generate separate high performance groups and low performance groups for each KPI. This may include determining a first ranking for the parameter value combinations based on probability of achieving a first KPI and determining a second ranking for the parameter value combination based on the probability of achieving a second KPI, for example. Additional rankings may also be determined for other KPIs. The parameter value combinations may have different orders in each of the rankings. Different high performance groups and low performance groups may be generated for each KPI.

In an example, a first high performance group (e.g., high performance group A 292) for the first KPI may include those parameter value combinations having a highest probability of achieving the first KPI and a second high performance group (e.g., high performance group B 295) for the second KPI may include those parameter value combinations having a highest probability of achieving the second KPI. Similarly, a low performance group for the first KPI (e.g., low performance group A 294) may include those parameter value combinations from the performance cluster 290 not included in the high performance group for the first KPI and a low performance group for the second KPI (e.g., low performance group B 297) may include those parameter value combinations from the performance cluster 290 not included in the high performance group for the second KPI. The parameter value combinations that are members of the first high performance group may differ from the members of the second high performance group.

Resource allocator 260 allocates resources (e.g., money, time, etc.) for a campaign to the parameter value combinations in the performance cluster 290 (or performance clusters). The resources may be allocated to the parameter value combinations based on at least one of the ranking of the parameter value combinations for one or more KPIs as determined by the grouping module 245 and/or on the performance group or groups that the parameter value combinations are members of. In one embodiment, one or more non-linear functions are used to allocate resources to the parameter value combinations. The non-linear function or functions may include a cubic function, a near-linear function, an exponential function, and/or some other non-linear function. The non-linear function may provide a very fast decrease or a slower decrease in budget allocation to parameter value combinations as ranking decreases for those parameter value combinations. A non-linear function may allocate resources between a high performance group and a low performance group nonlinearly. Additionally, a non-linear function may be used to allocate resources to the parameter value combinations within a high performance group and within a low performance group. For example, a high percentage of available resources (e.g. 85%, 90%, 95%, etc.) may be allocated to a high performance group and a low percentage of the available resources (e.g., 5%, 10%, 15%, etc.) may be allocated to the low performance group. The resources allocated to the high performance group may then be divided between the parameter value combinations in the high performance group based on the ranks of the parameter value combinations in the high performance group. These resources may be divided in a non-linear manner such that a highest ranked parameter value combination receives more resources than a second ranked parameter value combination, which receives more resources than a third ranked parameter value combination, and so on. The resources allocated to the low performance group may be divided non-linearly between the parameter value combinations in the low performance group in a similar manner.

As indicated, in some embodiments multiple different KPIs may be important. Accordingly, total resources may be divided between allocations for achieving each of the KPIs. For example, a first amount of resources may be allocated for achieving a first KPI and a second amount of resources may be allocated for achieving a second KPI. The resources allocated for each KPI may be allocated non-linearly as described above based on the ranking and performance groups for that KPI.

Some or all of the same parameter value combinations will be allocated resources for the first KPI and for the second KPI. For example, a first parameter value combination may have a highest rank in a high performance group of a first KPI, and may be allocated 40% of the budget for the first KPI. That same parameter value combination may have the second highest rank in the low performance group of a second KPI, and may be allocated 0.5% of the budget for the second KPI. If a total budget is divided evenly between the first and second KPI, then an amount of the total budget that is allocated for the parameter value combination may be 20.25%.

The second level optimization module 235 may perform its operations continuously or periodically during a campaign using the machine learning techniques of supervised learning, statistical machine learning and/or deep learning. The second level optimization process may be performed in real time or near-real time during a campaign to maintain optimal use of resources as conditions change. For example, the cost of impressions associated with different parameter value combinations may change over time. A probability of achieving a KPI may determine how many impressions should be performed to achieve an even associated with the KPI. Accordingly, if the KPI is expressed in terms of cost/desired response event, then the ranking of the parameter value combinations may be adjusted as the cost associated with these parameter value combinations changes.

As new data is generated based on updated impressions for creative content 275 and associated response events 280, the probabilities of parameter value combinations achieving KPIs are reevaluated, the rankings of the parameter value combinations are updated, and the membership in the high performance groups and low performance groups may be updated. For example, parameter value combinations may change ranking within the high or low performance group, may be demoted from the high performance group to the low performance group and/or may be promoted from the low performance group to the high performance group over time. The resource allocation between the parameter value combinations may be updated accordingly based on the updated rankings and membership status in the high and/or low performance groups.

The first level optimization module 210 may obtain enough information to determine scores for some parameter values before other parameter values. For example, first level optimization module 210 may determine scores for the parameter values of male and female before scores are determined for other parameter values. Such information may be used to generate a short term performance cluster based on parameter values or parameter value combinations that have a lower dimension than the initial parameter space. In an example, the parameter space is S={Da, Dg, I, B, Cb, Ch, Cc} and scores are determined for all of the parameter values of Dg while testing commences for the remaining parameters. The example parameter space may have seven dimensions (one for each parameter). In this example, the functions that the first level optimization module 210 aims to ultimately solve may each have 7 variables, one for each parameter. However, the clustering module 212 may generate interim performance clusters based on the available information on the male and female parameter values.

As additional information is received, first level optimization module 210 may update the short term performance cluster. The parameter value combinations in the updated short term performance cluster may have a higher dimension than those in the previous short term performance cluster. For example, if information is received for the parameter values of the parameter Cc, then the updated performance cluster may be expanded from (male) to (male, Cc=1) and (male, Cc=5). This process may continue until all information is received and the full performance cluster 290 is determined.

The second level optimization module 235 may begin performing second level optimization operations as soon as a short term performance cluster has been determined. As the Short term performance cluster is updated, second level optimization module 235 may update the high and low performance groups accordingly. This enables second level optimization to begin for a campaign even before the first level optimization process is complete, and for the optimization to be continuously refined and improved while the first level optimization process is performed.

In embodiments, the first level optimization module 235 gradually and continuously produces parameter value combinations based on available estimates in the first level optimization process. The second level optimization process may then be performed on a set of the parameter value combinations while the first level optimization process continues to gather additional data and produce additional parameter value combinations. Additionally, or alternatively, an output of the second level optimization process may be used to build a more accurate estimate for the first level optimization process, and the parameter space (e.g., of S={Da, Dg, I, B, Cb, Ch, Cc}) and the dimension of the performance cluster output by the first level optimization process may be gradually extended. In this way sub-clusters of smaller dimensions are continuously produced by the first level optimization process until the full dimension performance cluster is produced.

For example, consider the parameter space S={Cb, Ch, Cc, Dg, Da}. If an assumption is made that 10,000 impressions are needed to estimate a single dimension function g(x), and a number or dimension of background images is 10 and larger than dimensions of other variables (gender, age groups, copies, CTA), then 100,000 impressions (10,000× 10) are needed to have sufficient complete statistics to move to the second level optimization process. By building parameter value combinations for the second level optimization process gradually, the system can have combinations such as {X, Cc, X, Dg, X}, where X defines a currently unknown variable selected randomly to advance to the second level optimization process once there is sufficient data for at least some of the variables. For example, if there are 3 messages Ch, the system needs just 30,000 impressions (3×10,000) to build optimal combinations that take into account a message/gender optimal combination in {Ch, Dg} and build a two dimensional performance cluster: {X, Ch, X, Dg, X}, where X defines unknown variables that are selected randomly. As soon as the first level optimization process generates additional g(x) estimates, the space could be gradually extended to {Cc, Ca, Dg} until all g(x) are estimated and the final performance cluster is produced for the whole space {Cb, Ch, Cc, Dg, Da}.

Parameter value combinations for which insufficient information has been determined to classify those parameter value combinations as belonging to the performance cluster 290 or the discard cluster 291 are included in an insufficient data group 298. Once no parameter value combinations are in the insufficient data group 298, the first level optimization process is complete. However, at any time new creative content elements may be produced. When this occurs, the first level optimization process is again performed by first level optimization module 210 to include these new creative content elements.

As discussed above, the second level optimization process may be an ongoing process that periodically or continuously updates the high and low performance groups. In some embodiments, if a parameter value combination remains in the low performance group of a KPI for a threshold amount of time or after a threshold number of updates of the performance groups, that parameter value combination is removed from the low performance group for the KPI and moved to a discard group for that KPI. In a further embodiment, parameter value combinations are moved to the discard group for a KPI if they retain a rank below a threshold rank in the low performance group for that KPI after a threshold amount of time or updates of the performance groups. Accordingly, the low performance groups shrink over time. For example, if a parameter value combination remains in the bottom 100 of the low performance group for 1 week, then that parameter value combination may be moved to the discard group for that KPI. Parameter value combinations that are moved to the discard cluster for a KPI will no longer be used for that KPI (e.g., no resources will be allocated for those parameter value combinations for that KPI). In the example shown, there is a discard group A 299 for a first KPI and a discard group B 293 for a second KPI.

Embodiments have been described in which the operations manager 205 conducts and optimizes a campaign. However, the operations manager 205 may also be provided as a service to optimize campaigns run by third parties (e.g., by third party server 283). In such an embodiment, the third party server 283 may generate creative content, send that creative content to the audience 285, and receive response events. The third party server may send test data 287 that includes information on the creative content, the audience segments to which the creative content has been sent, and responses to the creative content to operations manager 205. First level optimization module 210 may perform the first level optimization process from the test data 287, generate optimization information 289 that includes the performance cluster 290, and send the optimization information 289 to the third party server 283. The third party server 283 may then update its campaign based on the performance cluster 290 and generate additional test data 287 and send it to operations manager 205. Second level optimization module 235 may then perform the second level optimization process based on the updated test data 287, generate updated optimization information 289 that includes information on high level and low level performance groups, and send the updated optimization information 289 to the third party server 283. The third party server 283 may then update its campaign based on the information on the performance groups.

The operations manager 205 has been discussed with reference to optimizing a single parameter space using a two-level optimization process that includes a first level optimization process and a second level optimization process. In some instances the single parameter space may be divided into multiple subspaces, and the first and second level optimization processes may be performed on each of the subspaces. The two subspaces may intersect by one or more parameters. Parameter value combinations from the separately optimized subspaces may then be combined to form composite parameter value combinations. Operations may be performed on the parameter value combinations, such as delivering creative content 275 to audience 285. Examples are provided below with reference to FIG. 12.

FIGS. 3-7 are flow diagrams showing various methods for determining optimal parameter value combinations for a problem space. The methods may be methods of machine learning that are performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing an operations manager, such as operations manager 205 of FIG. 2.

Figure 3:
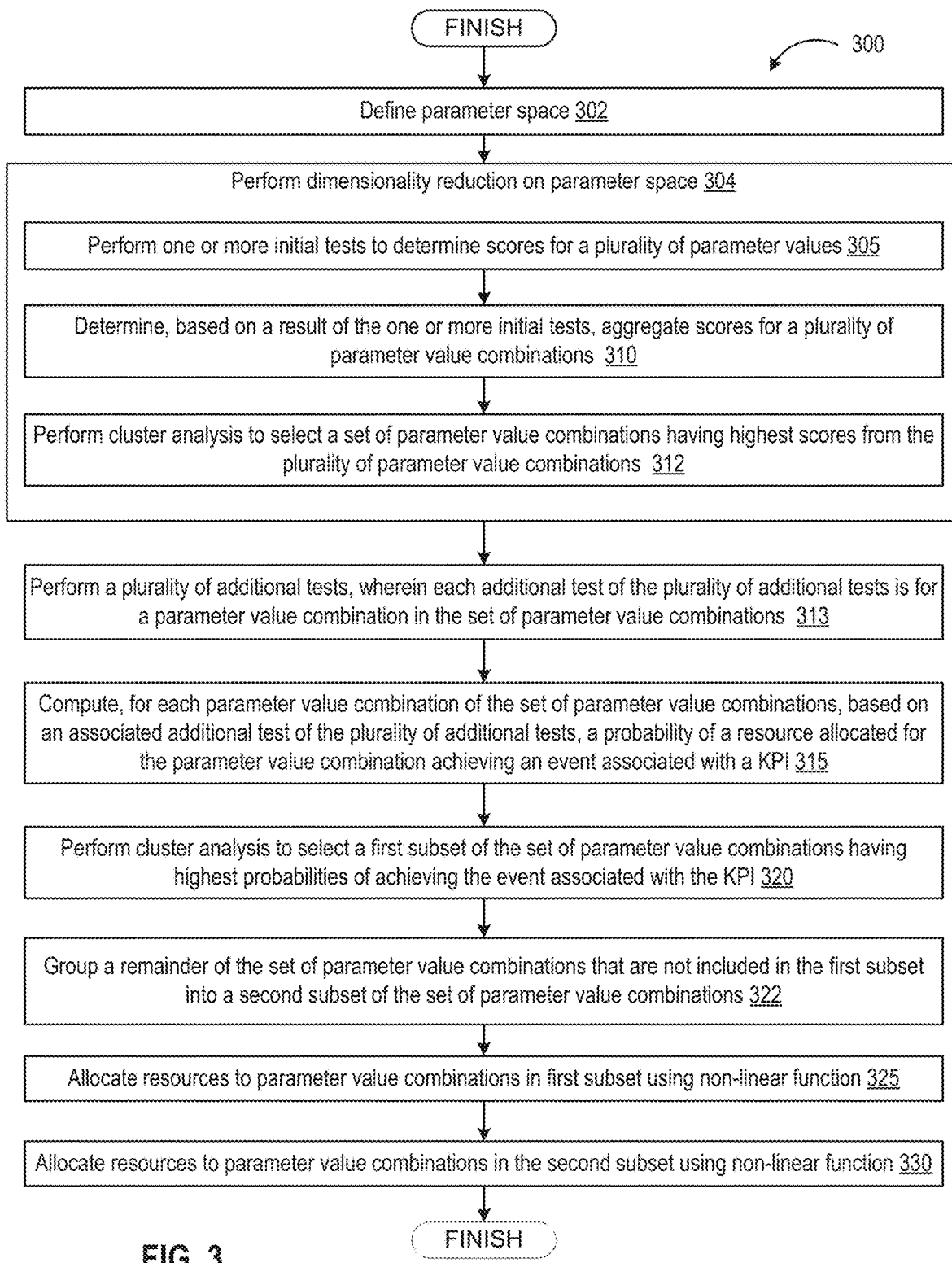
FIG. 3 is a flow chart of an example method for reducing a problem space to a group of optimal parameter value combinations, in accordance with an embodiment of the present disclosure.

FIG. 3 is a flow chart of an example method 300 for a two level optimization process of reducing a problem space to a group of optimal parameter value combinations, in accordance with an embodiment of the present disclosure. At block 302 of method 300, processing logic defines a parameter space or receives a definition of a parameter space.

At block 304, processing logic performs dimensionality reduction on the parameter space. The goal of the dimensionality reduction is to reduce a total number of possible parameter value combinations in the parameter space to a performance cluster made up of a much smaller set of parameter value combinations. For example, a parameter space of 160 million parameter value combinations may be reduced to a set of about 10 thousand parameter value combinations. Dimensionality reduction is a technique of machine learning to reduce the number of random variables under consideration via obtaining a set of principal variables. The dimensionality reduction may be performed in association with data mining in embodiments. Data mining is the computational process of discovering patterns in large data sets. In embodiments of the present invention, the data mining is performed to find the parameter value combinations that maximize a KPI. Data mining includes the automatic or semi-automatic analysis of large amounts of data to extract patterns and dependencies. Accordingly, the data mining may be performed to determine, from many parameters and millions of parameter value combinations, specific parameter values that have a large influence on a KPI as well as parameter value combinations that have a highest probability of achieving a KPI.

Dimensionality reduction can be divided into feature selection operations and feature extraction operations. Feature selection approaches attempt to find a set of variables or parameters (also called features) for use in model construction. Feature selection may be performed to simplify models, reduce training times and enhance generalization. Feature selection includes identifying and removing features (e.g., parameter values) that are either redundant or irrelevant. In embodiments of the present invention, feature selection may include identifying and removing parameter value combinations that have a low probability of achieving a KPI.

Feature extraction starts with an initial set of measured data and builds derived values (e.g., parameter value combinations) intended to be informative and non-redundant. Feature extraction reduces the amount of resources required to describe a large set of data. Feature extraction involves constructing combinations of variables (e.g., parameter value combinations).

At block 305, processing logic may perform one or more initial tests to determine scores for a plurality of parameter values. Each score may be based on a number of impressions that were achieved for a particular parameter value and a number of desired events that resulted from the impressions. At block 310, processing logic may determine, based on a result of the one or more initial tests, aggregate scores for a plurality of parameter value combinations. For example, an aggregate score may be determined for each parameter value combination in the problem space. An aggregate score may be based on a combination (e.g., a linear combination) of the scores for the parameter values that are included in a parameter value combination.

At block 312, processing logic selects a set of parameter value combinations having highest scores from the plurality of parameter value combinations. The selected set of parameter value combinations may be selected based on aggregate scores such that parameter value combinations with highest aggregate scores are included in the set.

In one embodiment, the parameter value combinations are ranked based on aggregate scores. In one embodiment, a cut-off point for the parameter value combinations to include in the set is chosen via cross-validation. In such an embodiment, the feature selection machine learning technique that may be used is a filter-style feature selection machine learning technique. The aggregate scores may each be compared to a desired output (e.g., a minimum probability of achieving a KPI) to determine an error probability, an inter-class distance, a probabilistic distance, or other distance measure. The distance measure as computed for parameter value combinations may be used to determine inclusion in the performance cluster.

In one embodiment, processing logic performs cluster analysis based on the aggregate scores to select the set (referred to as the performance cluster). In particular, processing logic may use the aggregate scores and/or a ranking of the parameter value combinations based on their aggregate scores to divide parameter value combinations into a performance cluster and a discard cluster. Cluster analysis is one common task in data mining and statistical data analysis, and includes grouping a set of objects (e.g., parameter value combinations) into groups called clusters in such a way that objects in a cluster are more similar to each other than to those in other clusters. Importantly, clustering determines clusters in data (e.g., in the parameter value combinations) without using known structures in the data.

The cluster analysis may be performed using one or more clustering algorithms. Clustering algorithms may cluster based on one or more of distances between cluster members, dense areas in data space, intervals or particular statistical distributions. Cluster analysis may be performed as an iterative process. Clustering may be performed using, for example, connectivity models that are based on distance connectivity, centroid models such as the k-means clustering algorithm that represent each cluster as a single mean vector, distribution models, density models, subspace models, group models, graph-based models, and so on.

For k-means clustering, n observations are partitioned into k clusters. In embodiments of the present invention, n is the total number of unique parameter value combinations and k is two or more, where one or more first clusters are performance clusters and one or more second clusters are discard clusters. For k-means clustering, each parameter value combination belongs to the cluster with the closest mean, where the mean serves as a prototype for the cluster. One or more heuristic algorithms may be used to converge to a local optimum and provide an output of the k-means clustering.

Given a set of n parameter value combinations ($x_1$, $x_2$, ... $x_n$), where each parameter value combination is d-dimensional real vector, k-means clustering may partition the n parameter value combinations into k (≤n) sets S={$S_1$, $S_2$, ..., $S_k$} so as to minimize the within-cluster sum of squares (sum of distance functions of each point in the cluster to the K center).

An alternative clustering technique that may be used for the clustering is an expectation-maximization clustering algorithm, which will not be described herein for brevity. In further embodiments, processing logic may perform structured learning to find relationships between the parameters and/or parameter values. Such structured learning may be performed by generating a Bayesian Network, for example.

At block 313, processing logic performs a plurality of additional tests. A separate test may be performed for each parameter value combination in the determined set.

At block 315, processing logic computes, for each parameter value combination of the set of parameter value combinations, based on an associated additional test of the plurality of additional tests, a probability of the parameter value combination achieving an event associated with a KPI. At block 320, processing logic performs cluster analysis (e.g., k-means clustering) to select a first subset of the set of parameter value combinations having highest probabilities of achieving the event associated with the KPI. The k-means clustering may be performed, or example, to divide a performance cluster (the set) into a high performance group and a low performance group. The cluster analysis may also be performed to group a remainder of the set of parameter value combinations that are not included in the first subset (high performance group) into a second subset (low performance group). At block 325, processing logic allocates resources to the parameter value combinations in the first set using a non-linear function. At block 330, processing logic allocates resources to the parameter value combination in the second subset using the non-linear function or an additional non-linear function.

Figure 4:
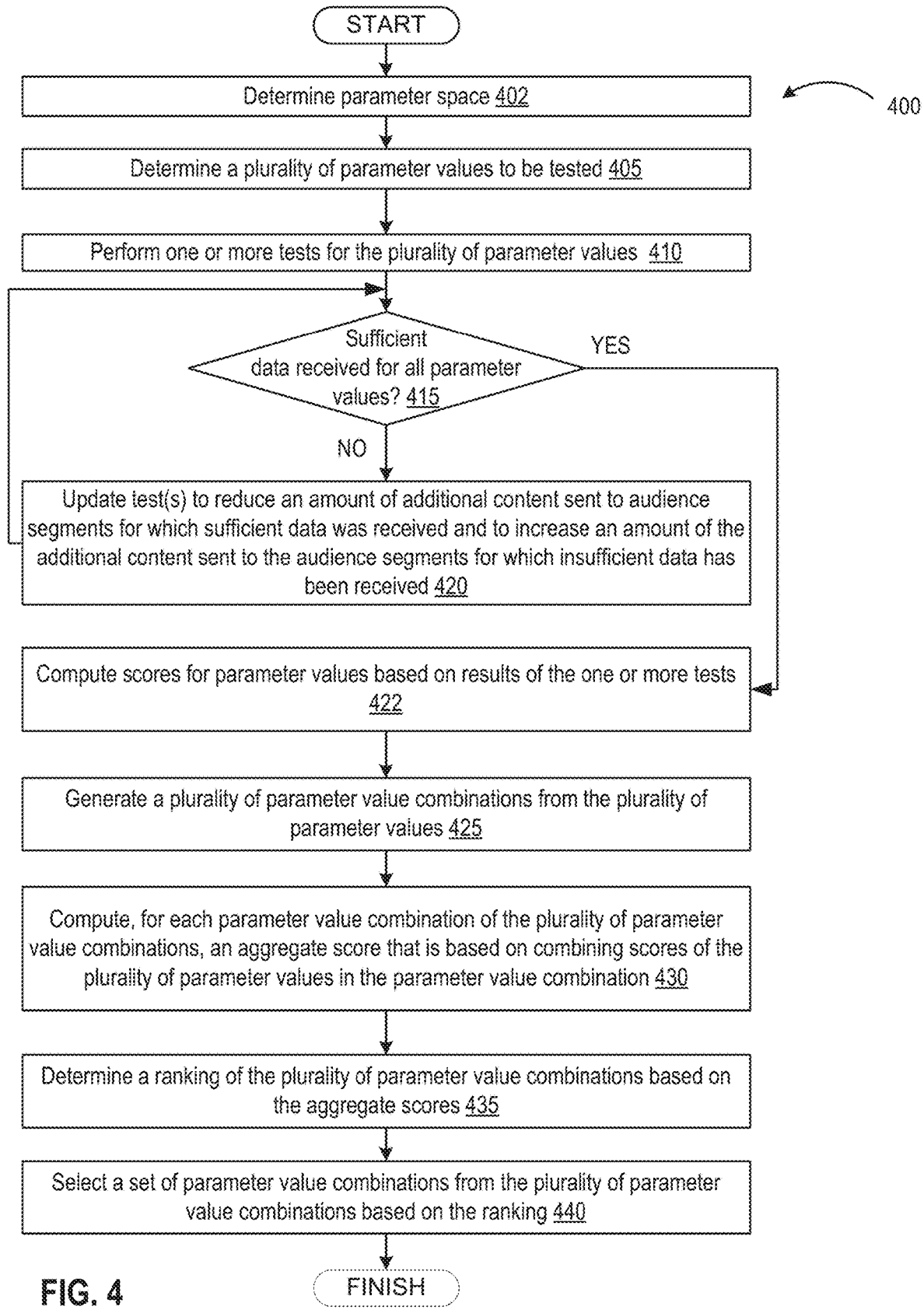
FIG. 4 is a flow chart of an example method for determining a performance cluster from a problem space, in accordance with an embodiment of the present disclosure.

FIG. 4 is a flow chart of an example method 400 for determining a performance cluster from a problem space, in accordance with an embodiment of the present disclosure. At block 402 of method 400, processing logic determines a parameter space. At block 405, processing logic determines a plurality of parameter values to be tested. At block 410, processing logic performs one or more tests for the plurality of parameter values.

At block 415, processing logic determines if sufficient data has been received for all of the parameter values. If insufficient data have been received for some parameter values and sufficient data has been received for other parameter values, the method may proceed to block 420. If sufficient data has been received for all parameter values, the method may proceed to block 422.

At block 420, processing logic updates the one or more tests to reduce an amount of additional content to send to audience segments for which sufficient data was received and to increase an amount of additional content that is sent to those audience segments for which insufficient data has been received. In other words, the traffic of creative content sent to audience segments may be balanced. The method may then return to block 415.

At block 422, processing logic computes scores for parameter values based on results of the one or more tests. At block 425, processing logic generates a plurality of parameter value combinations from the plurality of parameter value combinations. The plurality of parameter value combinations may include all possible parameter value combinations in the parameter space.

At block 430, processing logic computes, for each parameter value combination of the plurality of parameter value combinations, an aggregate score that is based on combination the scores of the plurality of parameter values in the parameter value combination. At block 435, processing logic determines a ranking of the plurality of parameter value combinations based on the aggregate scores. At block 440, processing logic then selects a set of parameter value combinations to include in a performance cluster based on the ranking. In one embodiment, a cluster analysis technique such as k-means clustering is used to select the set of parameter value combinations.

In some embodiments, method 400 may be performed using an independent component analysis (ICA) technique to separate a multivariate signal (e.g., the multi-variate parameter space) into additive subcomponents. Scores for these additive subcomponents are determined and combined, and then the aggregate scores are then used to perform cluster analysis.

Figure 5:
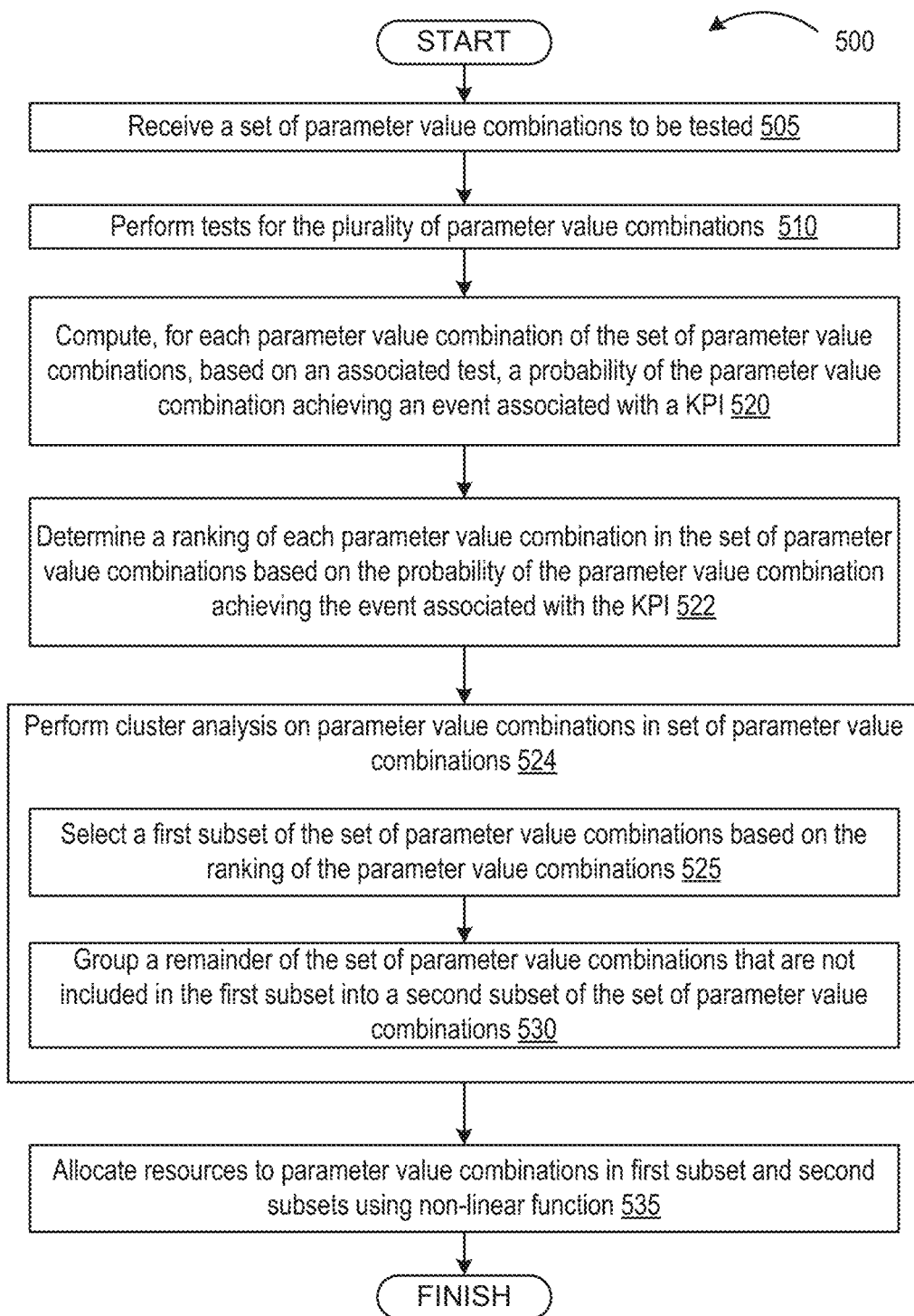
FIG. 5 is a flow chart of another example method for determining a performance cluster from a problem space, in accordance with an embodiment of the present disclosure.

FIG. 5 is a flow chart of another example method 500 for determining a performance cluster from a problem space, in accordance with an embodiment of the present disclosure. At block 505 of method 500, processing logic receives a set of parameter value combinations to be tested. The received set may be a performance cluster of parameter value combinations. At block 510, processing logic performs tests on each of the plurality of parameter value combinations.

At block 520, processing logic computes, for each parameter value combination in the set, based on an associated test, a probability of the parameter value combination achieving an event associated with a KPI. At block 522, processing logic determines a ranking of each parameter value combination in the set of parameter value combinations based on the determined probabilities of achieving the KPI.

At block 524, processing logic performs cluster analysis on the parameter value combinations in the set based on the determined probabilities. This may include performing the operations of blocks 525 and 530. At block 525, processing logic may select a first subset of the set of parameter value combinations based on the ranking. The first set may be a high performance group for the KPI. At block 530, processing logic groups a remainder of the set into a second subset. The second subset may be a low performance group.

At block 535, processing logic allocates resources to parameter value combination in the first set and the second set using one or more non-linear functions. This may cause a higher amount of resources to be used for the first subset and a lower amount of resources to be used for the second subset. Additionally, for the parameter value combinations in the first subset, a higher amount of resources may be allocated to higher ranked parameter value combinations than to lower ranked parameter value combinations. Similarly, for the parameter value combinations in the second subset, a higher amount of resources may be allocated to higher ranked parameter value combinations than to lower ranked parameter value combinations.

Figure 6:
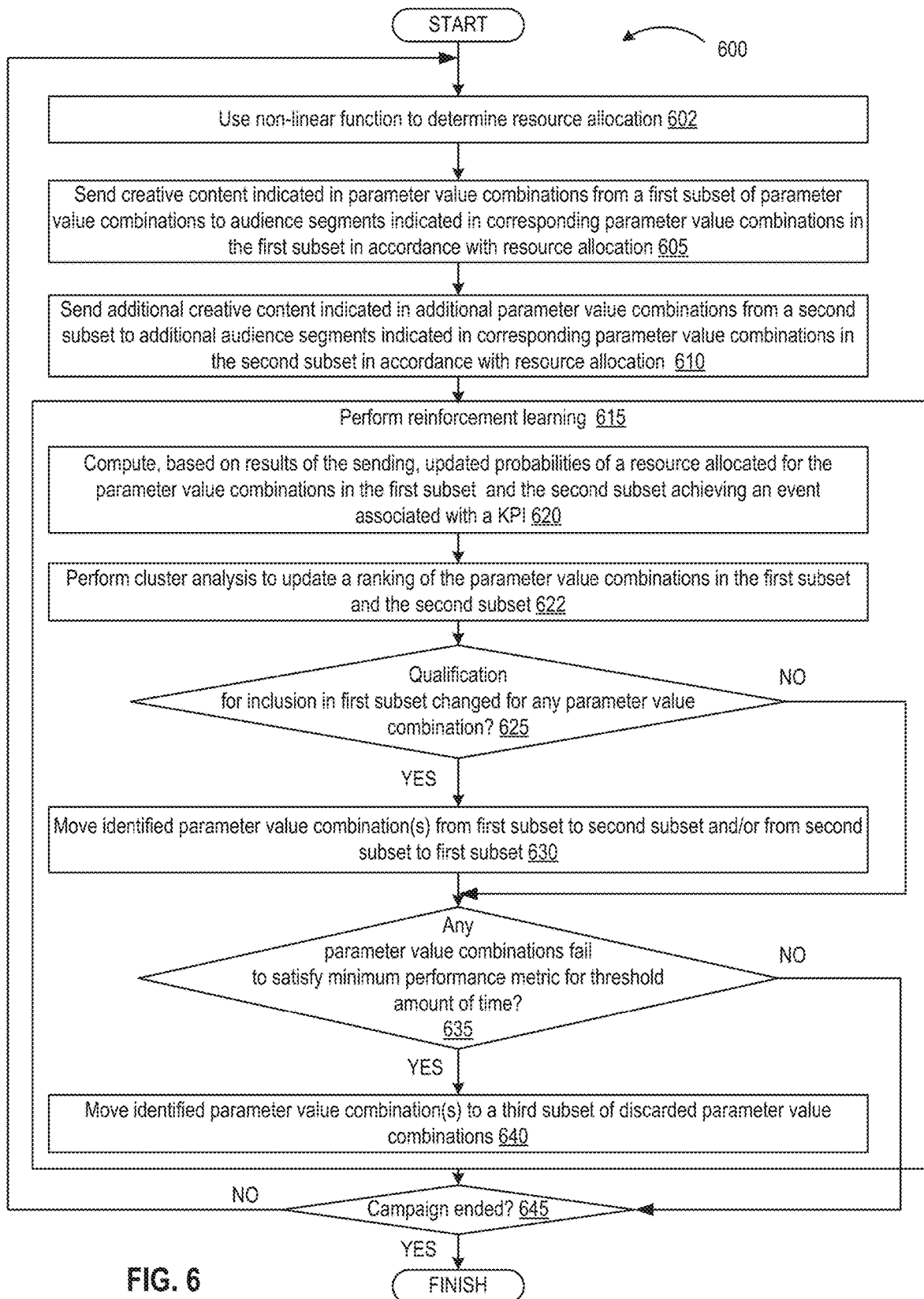
FIG. 6 is a flow chart of an example method for allocating resources to a performance group using a non-linear function and for performing reinforcement learning to update the performance group, in accordance with an embodiment of the present disclosure.

FIG. 6 is a flow chart of an example method 600 for allocating resources to a performance group using a non-linear function and for performing reinforcement learning to update the performance group, in accordance with an embodiment of the present disclosure. At block 602 of method 600, processing logic uses a non-linear function to determine resource allocation to parameter value combinations in one or more high performance groups (e.g., a first subset) and one or more low performance groups (e.g., a second subset).

At block 605, processing logic sends creative content to audience segments indicated in parameter value combinations in the first subset to audience segments indicated in corresponding parameter value combinations in the first subset in accordance with the determined resource allocation. At block 610, processing logic sends additional creative content to audience segments indicated in parameter value combinations in the second subset to audience segments indicated in corresponding parameter value combinations in the second subset in accordance with the determined resource allocation.

At block 615, processing logic performs reinforcement learning to optimize resource utilization. Reinforcement learning is an area of machine learning that uses measured results to arrive at an optimized result over time, and over multiple iterations. A reinforcement model may include a set of environment and agent states S, a set of actions that processing logic may perform A, policies of transitioning from states to actions, rules that determine a scalar immediate reward of a transition, and rules that describe what processing logic observes (e.g., impressions and resulting events). For reinforcement learning, processing logic performs optimization in multiple discrete time steps. After each time step, processing logic may update the determined optimal result (e.g., optimal ranking and clustering of parameter value combinations). At each time step, processing logic determines the optimal ordering of parameter value combinations and allocates resources accordingly.

Performing the reinforcement learning may include performing one or more operations of blocks 620-640. At block 620, processing logic computes, based on results of the sending at blocks 605-610, updated probabilities of a resource allocated for the parameter value combinations in the first subset and second subset achieving an event associated with a KPI. At block 622, processing logic performs cluster analysis to update a ranking of parameter value combinations in the first subset and second subset.

At block 625, processing logic determines if qualification for inclusion in the first subset has changed for any parameter value combination (e.g., if the updated cluster analysis performed at block 622 resulted in any parameter value combinations that had previously been included in the high performance group as being included in the low performance group or any parameter value combinations that had previously been included in the low performance group as being included in the high performance group). If so, the method continues to block 625 and processing logic moves the identified parameter value combination(s) from the first subset to the second subset and/or from the second subset to the first subset. Otherwise the method proceeds to block 635.

At block 635, processing logic determines whether any parameter value combinations has failed to satisfy a minimum performance metric for a threshold amount of time. For example, processing logic may determine whether any parameter value combination has been in the second subset (low performance group) or has had a particular low ranking in the second subset for a threshold amount of time (e.g., 1 day, 2 days, 1 week, etc.). If so, the method continues to block 640 and the identified parameter value combination(s) are moved to a third subset of discarded parameter value combinations (the discard group). No resources will be allocated to these parameter value combinations.

At block 645, processing logic determines whether a campaign has ended. If not, the method repeats starting again at block 602. If the campaign is over, the method ends.

Figure 7:
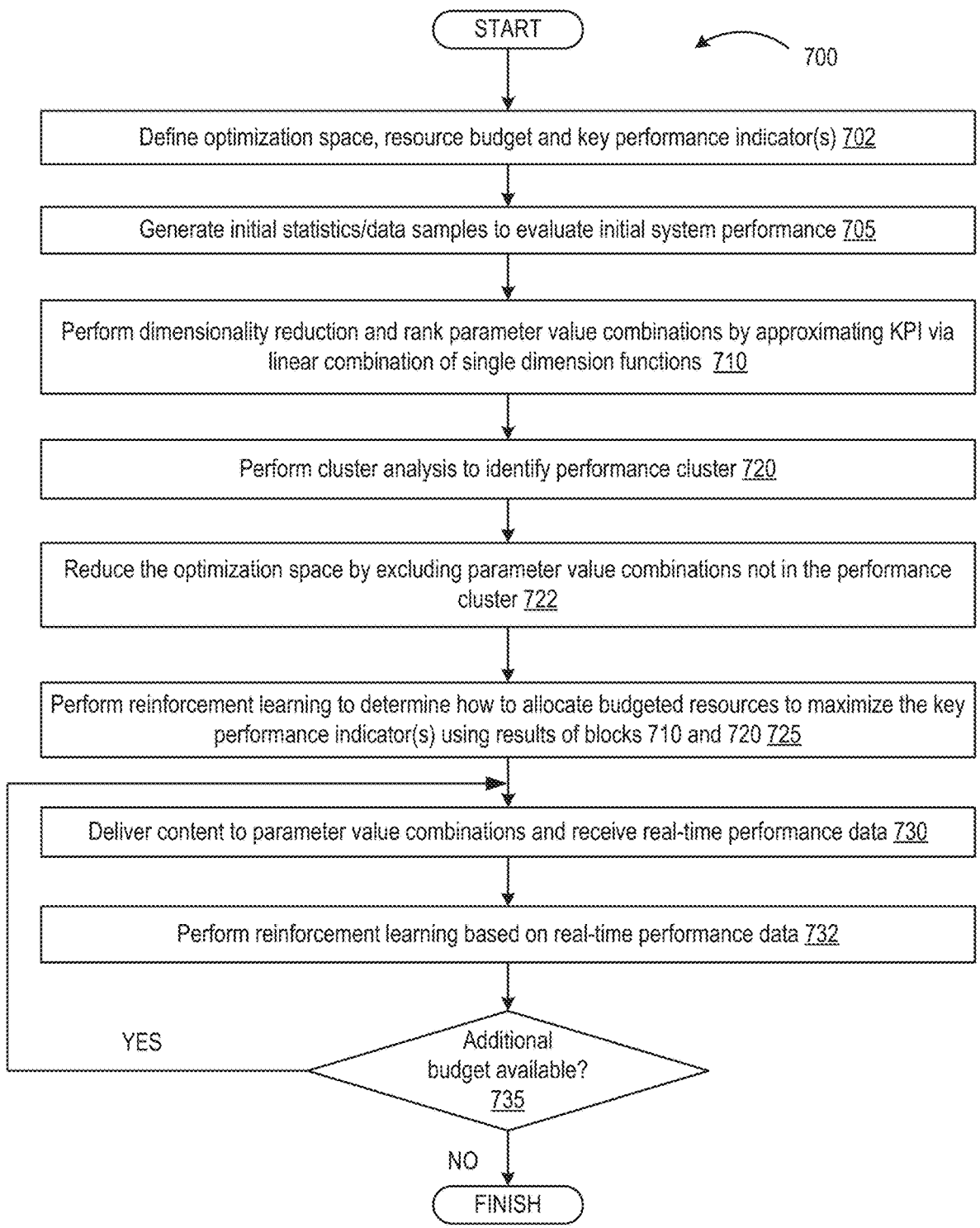
FIG. 7 is a flow chart of an example method for reducing a problem space to a group of optimal parameter value combinations, in accordance with an embodiment of the present disclosure.

FIG. 7 is a flow chart of an example method 700 for reducing a problem space to a group of optimal parameter value combinations, in accordance with an embodiment of the present disclosure. Method 700 includes a first level optimization process performed at blocks 702-722 and a second level optimization process performed at blocks 725-735. The second level optimization process may be repeated continuously or periodically during a campaign.

At block 705 of method 700 initial setup is performed, which includes defining an optimization space, a resource budget and one or more KPIs. The optimization space may be defined as S={D, I, B, C}, where D, I, B and C are sets that may be specific to a particular application where x=($x_d$, $x_i$, $x_d$, $x_c$). Accordingly, the optimization space may be:

$$S=\{D,I,B,C\}=\{x(x_d,x_i,x_d,x_c)|x_d \in D, \ldots ,x_c \in C\}$$

where N is the number of items x in S, N=count(x∈S), and count(D)=card(D)=count($x_d$∈D) is the number of different $x_d$ in D subspace.

In one example, S={Da, Dg, I, B, Cb, Ch, Cc} and x=($x_{da}$, $x_{dg}$, $x_i$, $x_b$, $x_{cb}$, $x_{ch}$, $x_{cc}$). A count(Dg) is the subspace of genders=2 (male|female).

Figure 8B:
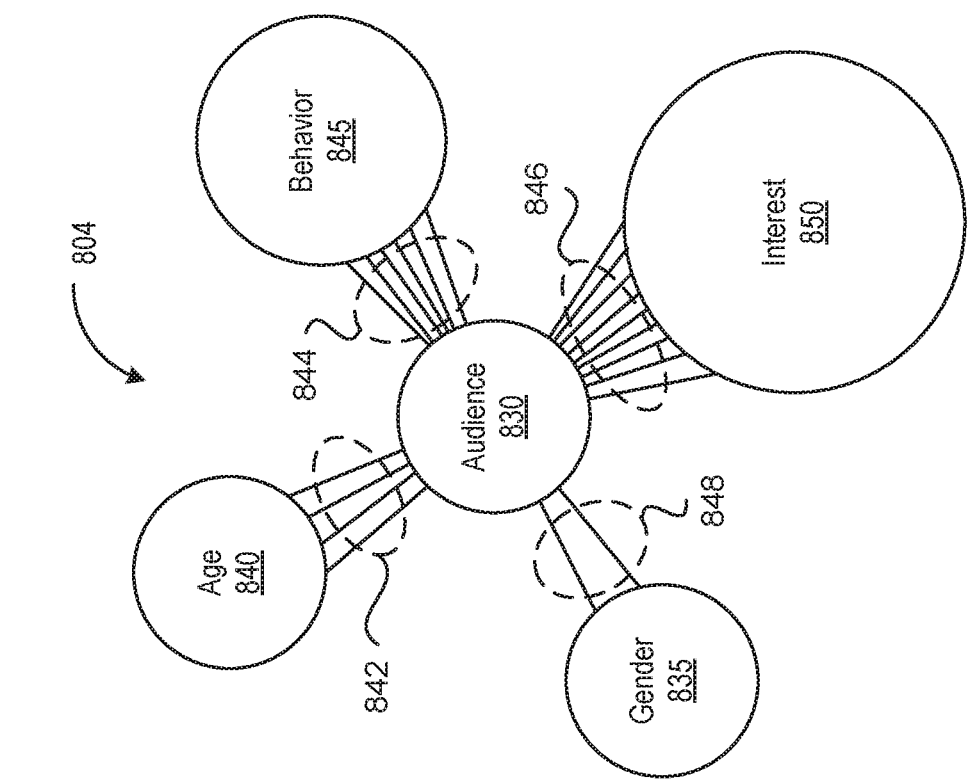
FIG. 8B is a diagram illustrating a second portion of a problem space, in accordance with an embodiment of the present disclosure.
Figure 8A:
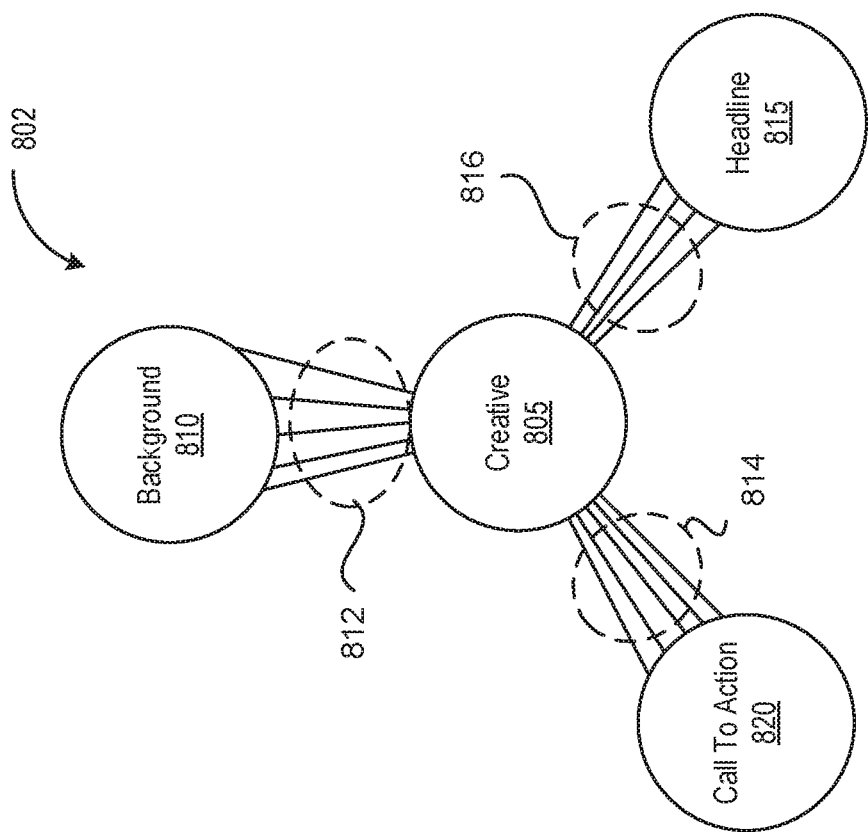
FIG. 8A is a diagram illustrating a first portion of a problem space, in accordance with an embodiment of the present disclosure.

FIG. 8A is a diagram illustrating a first portion 802 of a problem space and FIG. 8B is a diagram illustrating a second portion of the problem space 804, in accordance with an embodiment of the present disclosure. As shown, the optimization space may be divided into the two broad categories of a set of creative elements 805 and a set of audience segments 830. The set of creative elements 805 may include a call to action parameter 820, a headline (message) parameter 815 and a background parameter 810. The example call to action parameter 820 is a set 814 of five call to action parameter values, the example headline parameter 815 is a set 816 of four headline parameter values, and example the background parameter 810 is a set 812 of five background parameter values. Similarly, the example set of audience segments 830 includes a gender parameter 835, an age parameter 840, a behavior parameter 845 and an interests parameter 850. The example gender parameter 835 is a set of 2 gender parameter values, the example age parameter 840 is a set 842 of four parameter values, the example behavior parameter 845 is a set 844 of six behavior parameter values, and the example interest parameter 850 is a set 846 of nine interests parameter values.

Returning to FIG. 7, the defined resources R represent the budget or impression counts or other campaign resources. We can divide a defined budget into multiple slices:

$$R=R_L+R_1+\ldots+R_n$$

The estimation cost of each performance event (conversion) can be defined as $r_c$. The minimum number of performance events for a statistically relevant estimation may be $conv_{min}$. $R_L$ defines resources required to obtain initial learning to be able to reduce an initial parameter (optimization) space for the first level optimization process of blocks 702-722, and may be defined as:

$$R_L=conv_{min}\times r_c\times \text{MAX}(count(D),count(I),count(B),count(C))$$

For example, if the performance event is application (app) installation, and $r_c$=$5 and $conv_{min}$=10 then the initial parameter space with card(D)=16, card(I)=100, card(B)=100, card(C)=1000. Thus, in one example:

$$R_L=10\times 5\times 100=\$5000$$

$R_i$ resource slices are defined as resources spent on executing each subsequent iteration of the operations of blocks 725-735, where:

$$R_i = \frac{R - R_L}{n}$$

At block 705, processing logic generates initial data samples and statistics to evaluate initial system performance. The initial data samples may include random or deliberate parameter value combinations having an approximately even distribution of each of the parameter values. The initial data should include a statistically significant amount of data for each parameter value. Each item of data in the data sample is based on an impression of creative content having one or more creative content elements on a user having one or more audience segment parameter values. Resources $R_L$ may be spent to generate the initial data and accumulate the initial performance statistics. Initially, all elements are given equal resources (e.g., equal resources are used for each parameter value test).

At block 710, processing logic performs dimensionality reduction by generating a set of single dimension functions, where each single dimension function is for a particular parameter value. Accordingly, one or more multivariate functions that define the probability of achieving a KPI may be replaced with n single dimension functions, where n is the number of parameter values. Scores may be determined for each single dimension function. Aggregate scores may then be determined for each parameter value combination based on a linear combination of the scores for the parameter values included in the parameter value combination. Thus, the optimization space is reduced by approximating it as a combination of lower dimension subspaces, where each lower dimension subspace is a 1-dimensional space. For each item=$(x_d, x_i, x_d, x_c) \in S$, a performance approximation is made using the function G(x), where G(x) is a function of a criterion of optimality for learning, reinforcing, and re-ranking.

$$G(x) \approx \tilde{G}(x) = G_D(x_D) + G_I(x_I) + G_B(x_B) + G_C(x_C)$$

Where $G_D(x_D)$ is a performance estimation function in D subspace. The number of conversions for x may be represented as conv(x). The number of conversions may be, for example, a number of clicks, installs, purchases or other targeting actions. Accordingly, the function G(x) may be written as:

$$G_d(x_d^0) = \frac{\sum_{x \in S | x_d = x_d^0} conv(x)}{\sum_{x \in S | x_d = x_d^0} R_L(x)}$$

At block 720, processing logic performs cluster analysis to identify a performance cluster. The goal of the clustering is for a set of inputs to be divided into groups or clusters. Unlike in classification, the groups are not known beforehand, making this typically an unsupervised task. Using the determined estimation G(x) of performance for each item, the parameter value combinations can be arranged into a performance cluster and a discard cluster, or into more than two clusters.

To perform the cluster analysis, parameter value combinations may first be ranked according to the aggregate scores. Performance rank is assigned as the result of the previous step for each $x \in S$, so we can cluster elements into performance based groups. For example, the parameter space S may be split into 3 clusters, as follows:

$$S=S_0 \cup S_1 \cup S_2$$

Where one or more of $S_0$, $S_1$ and $S_2$ may be performance clusters or poor performing clusters.

Multiple different cluster analysis approaches may be used, such as k-means clustering, distribution-based clustering, expectation-maximization clustering, density-based clustering, and so on for creating performance clusters. Let's for simplicity consider clustering that is performed using a threshold based variant. We can define performance level as:

$$\text{average } MG = \frac{\sum_{x \in S} G(x)}{count(x \in S)} \cong M\tilde{G} = \frac{\sum_{x \in S} \tilde{G}(x)}{count(x \in S)},$$

where d is a deviation level, and where:

$$S0=\{x | x \in S, G(x) > M\tilde{G}+d\}$$

$$S1=\{x | x \in S, G(x) \in (M\tilde{G}-d, M\tilde{G}+d)\}$$

$$S2=\{x | x \in S, G(x) < M\tilde{G}-d\}$$

We can exclude poor performing clusters. In our example, $S_2$ is a poor performing cluster. Thus, the reduced optimization space may be the union of the two performance clusters $S_0$ and $S_1$, which may be represented as S'

$$S \rightarrow S' = S_0 \cup S_1$$

The first level optimization process may be complete after the operations of block 722 are performed.

FIG. 9A is a diagram illustrating the first portion 902 of the problem space of FIG. 8A after performing dimensionality reduction, in accordance with an embodiment of the present disclosure. FIG. 9B is a diagram illustrating the second portion 904 of the problem space of FIG. 8B after performing dimensionality reduction, in accordance with an embodiment of the present disclosure. As shown, the call to action parameter 820 has been reduced to a set 912 of three parameter values, the background parameter 810 has been reduced to a set 910 of three parameter values and the headline parameter 815 has been reduced to a set 914 of three parameter values. The gender parameter 835 has retained its set 848 of two parameter values, the age parameter 840 has been reduced to a set 916 of two parameter values, the behavior parameter 845 has been reduced to a set 922 of four parameter values, and the interests parameter 850 has been reduced to a set 920 of five parameter values. All possible combinations of the parameter values of the different parameters in the first portion 902 and the second portion 904 make up the performance cluster.

Returning again to FIG. 7, at block 725 the second level optimization process begins. At block 725, processing logic performs reinforcement learning to determine how to allocate budgeted resources to maximize one or more key performance indicators. Processing logic may determine multiple different performance groups, and may allocate resources $R_i$ to each group and each element (e.g., each parameter value combination) within the group so that elements and groups with higher $G_x$ (higher aggregate scores) are allocated greater resources. The performance groups may be determined based on the cluster analysis performed at block 720. For example, the cluster analysis may have identified two performance clusters, where one of the performance clusters had higher performing parameter value combinations than the second performance cluster. Resources may be allocated between the different performance clusters. Additionally, or alternatively, resources may be allocated non-linearly based on the aggregate scores computed at block 710. Those parameter value combinations having higher aggregate scores may be allocated greater resources than those having lower aggregate scores.

Continuing the above example, we get two subsets/groups $S_0$ and $S_1$ where subset $S_0$ contains higher ranked elements than subset $S_1$. We can spit $R_i$ resources allocated to each subset using either a linear or non-linear function based on performance (average or best) within each subset/group. For example, processing logic could allocate 70% of resources for $S_0$ and 30% of resources for $S_1$. Inside each group, $S_0$, $S_1$ for each parameter value combination x, resources are also allocated according to their aggregate scores or ranking using linear or non-linear distribution. In one embodiment, one or more easing functions are used to determine the non-linear distribution of the resources. Easing functions enable custom mathematical formulas to be applied to one or more groups in a non-linear manner.

Figure 10B:
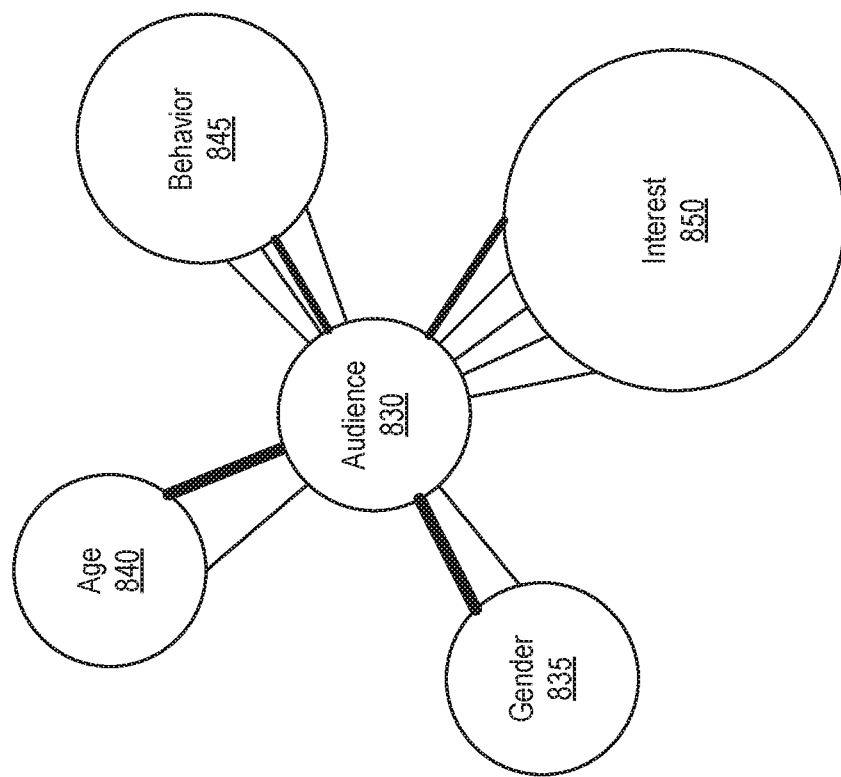
FIG. 10B is a diagram illustrating relative significance for each parameter value of the audience segments of the problem space of FIG. 9B, in accordance with an embodiment of the present disclosure.
Figure 10A:
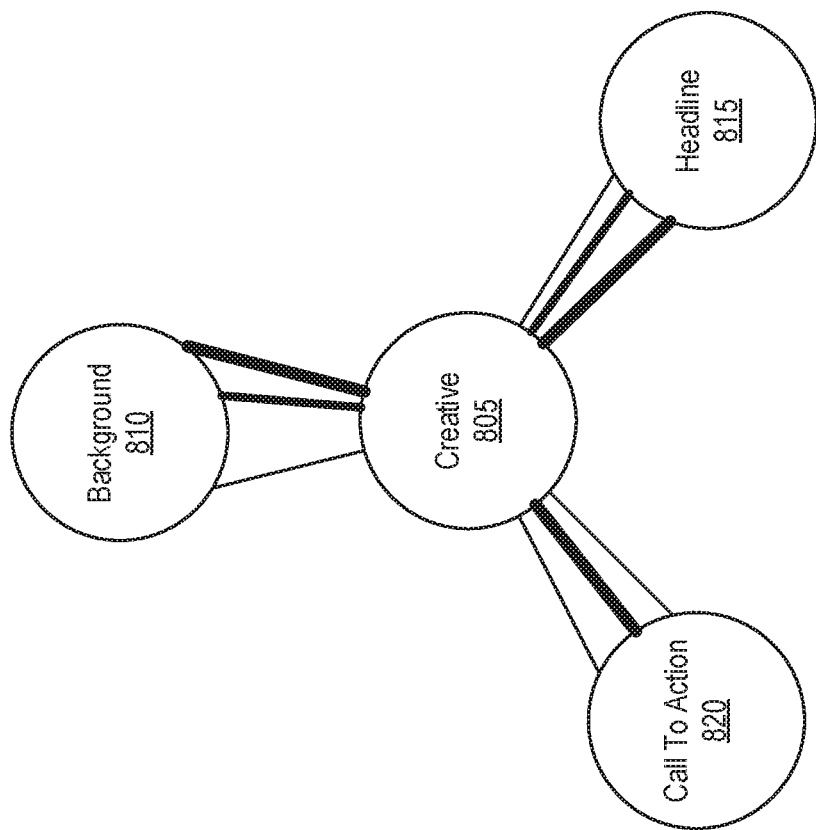
FIG. 10A is a diagram illustrating relative significance for each parameter value of the creative content elements of the problem space of FIG. 9A, in accordance with an embodiment of the present disclosure.

FIG. 10A is a diagram illustrating resource allocation for each parameter value of the creative content elements 805 of the problem space of FIG. 9A, in accordance with an embodiment of the present disclosure. FIG. 10B is a diagram illustrating resource allocation for each parameter value of the audience segments 830 of the problem space of FIG. 9B, in accordance with an embodiment of the present disclosure. Greater line weight represents a larger amount of resources that are allocated.

Returning to FIG. 7, at block 730 content is delivered to the parameter value combinations and real-time performance data is received. The volume of content that is delivered for each parameter value combination may be based on the resource distribution that was determined at block 725. At block 732, processing logic again performs reinforcement learning based on the real-time performance data. This may include computing actual probabilities of achieving the KPI(s) for each parameter value combination after spending $R_i$ resources for $x \in S$. This may further include re-ranking elements (parameter value combinations) $x \in S$ using real statistics in full optimized space G(x). In some cases it's useful to make linear combination of G(x) and $\tilde{G}(x)$. G(x) by statistics for n iterations may be defined as:

$$G(x) = \frac{conv(x)}{\sum_{i=0 \ldots n} Ri(x)}$$

Where $R_i(x)$ resources are spent on x in i iteration of operations 730-735, G(x) is a function of a criterion of optimality for learning and reinforcing, and conv(x) is a number of conversions required for estimation of the event x (for example clicks, installs, purchase or other targeting actions).

FIG. 11 is a diagram illustrating optimal parameter value combinations 1102 including a combination of the optimal parameter value combinations for the set of creative content elements of FIG. 10A and the optimal parameter value combinations for the set of audience segments of FIG. 10B, in accordance with an embodiment of the present disclosure. As shown the call to action parameter 820 includes a set 1112 of two parameter values, where one parameter value is much more relevant than the other parameter value. The background parameter 810 includes a set 1118 of two parameter values, where one parameter value is much more relevant than the other parameter value. The age parameter 840 includes a set 1120 of two parameter values, where one parameter value is much more relevant than the other parameter value. The gender parameter 835 includes a single parameter value 1116. The behavior parameter 845 includes a set 1122 of two parameter values, where one parameter value is much more relevant than the other parameter value. The interests parameter 850 includes a set 1124 of three parameter values with varying degrees of relevance. The headline parameter 815 includes a single parameter value 1114.

Returning again to FIG. 7, at block 735 processing logic determines whether there is additional budget available for the campaign (e.g., whether the campaign has ended). If there is additional budget available, then the method returns to block 730. Otherwise the method ends.

Figure 12:
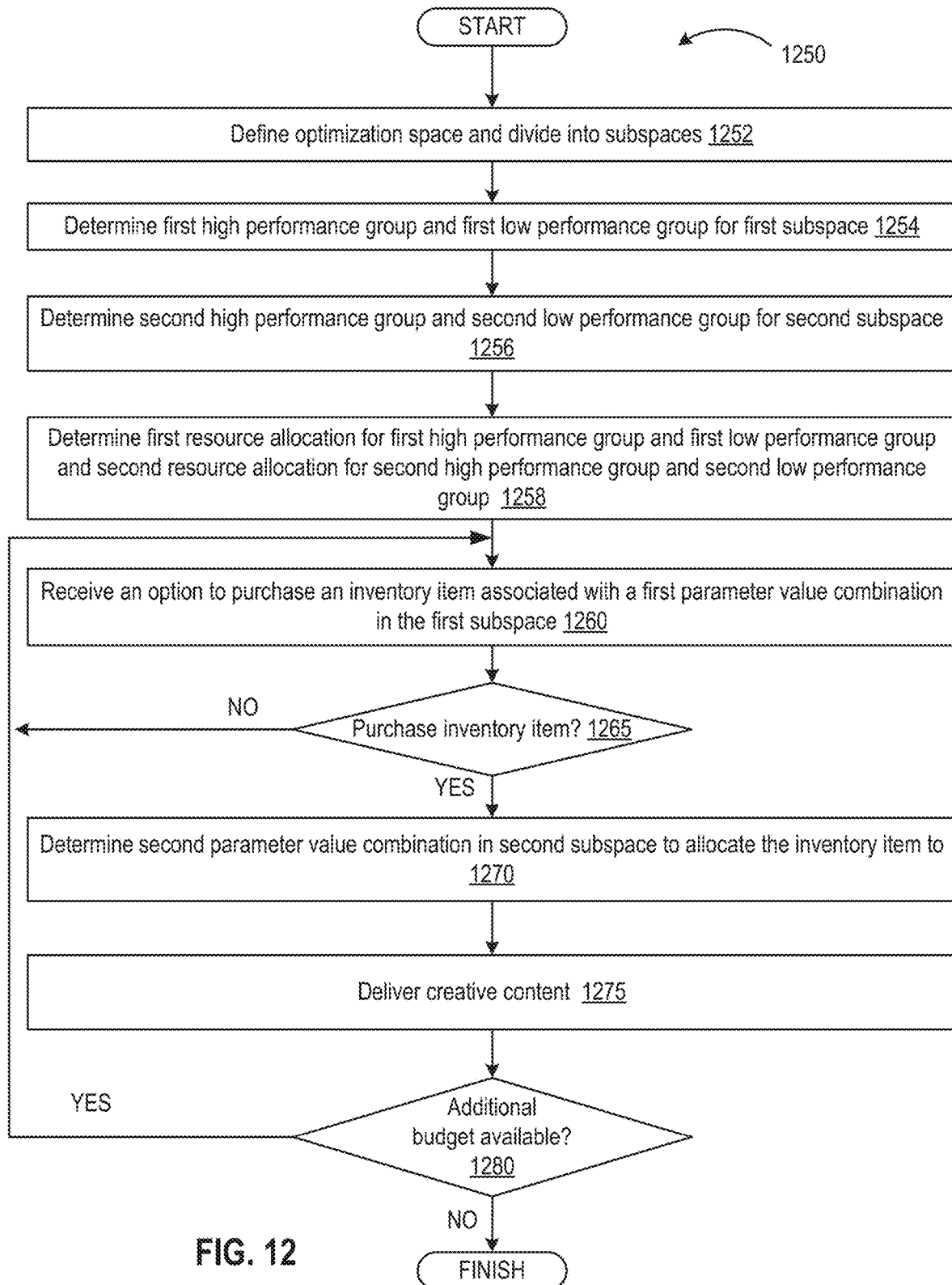
FIG. 12 is a flow chart of an example method for dividing a parameter space into subspaces and optimizing parameter value combinations in each of the subspaces.

FIG. 12 is a flow chart of an example method 1200 for dividing a parameter space into subspaces and optimizing parameter value combinations in each of the subspaces and separately applying the optimized subspaces to make decisions. For example, in some implementations processing logic may receive options to purchase inventory items, where only some parameter values are known regarding the inventory item (e.g., distribution medium, a placement in the distribution medium, and demographics about a user of the distribution medium). In such implementations, it can be useful to divide the parameter space into a subspace that includes parameters that will be known regarding the inventory items and additional parameters that may not be known at the time that the inventory item is offered. Optimization may be separately performed on the different subspaces, and then results of an optimized subspace may be used to determine whether to expend resources to acquire the inventory item.

Method 1200 is a method of machine learning that is performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of method 1200 are performed by a computing device executing an operations manager, such as operations manager 205 of FIG. 2.

At block 1252 of method 1200, processing logic defines an optimization space and divided that optimization space into multiple subspaces (e.g., into two subspaces). The different subspaces may each include a different set of parameters and of parameter value combinations for those parameters. The different subspaces may share one or more parameters and/or parameter values. This may enable parameter value combinations from the different subspaces to later be combined to form composite parameter value combinations. In one example, the parameter space includes a distribution medium parameter, a placement parameter, a plurality of audience segment parameters and a plurality of creative content element parameters. The distribution medium parameter may include parameter values for each possible distribution medium. Examples of distribution mediums include different applications (apps), web pages, documents, types of devices, and so on. Placement parameter values may include particular screen locations in a distribution medium, placement at a particular time in a distribution medium, placement at a particular dialogue in the distribution medium, placement in a particular page in the distribution medium and/or placement in a particular module, menu or feature of a distribution medium (e.g., placement when a user accesses a particular feature of an application or when a particular event occurs in the application). For example, advertisements or other creative content may be displayed within applications while a user uses the applications. Information may be known about the user, about the distribution medium (e.g., the application being used), and about the placement of creative content in the distribution medium. In the provided example, the parameter space may be divided into a first subspace that includes the distribution medium parameter, the placement parameter and the plurality of audience segment parameters (e.g., demographics parameters, interests parameters, behavior parameters, etc.) and a second subspace that includes the plurality of audience segment parameters and the plurality of creative content element parameters.

At block 1254, processing logic determines a first high performance group and a first low performance group for the first subspace. The first high performance group and the first low performance group may be determined using the aforementioned two level optimization process as discussed above (e.g., by applying operations from one or more of methods 300-700). For example, processing logic may perform one or more tests for each parameter value in the first subspace, determine scores for the parameter values, generate parameter value combinations for the parameters in the first subspace, determine aggregate scores for the parameter value combinations, rank the parameter value combinations based on the aggregate scores, perform cluster analysis to select a high performance cluster of parameter value combinations, perform additional tests for each parameter value combination in the high performance cluster, rank the parameter value combinations based on the additional tests, and perform cluster analysis to divide the parameter value combinations into the high performance group and a low performance group (both of which are in the high performance cluster).

At block 1256, processing logic determines a second high performance group and a second low performance group for the second subspace. The second high performance group and the second low performance group may be determined using the aforementioned two level optimization process as discussed above (e.g., by applying operations from one or more of methods 300-700). For example, processing logic may perform one or more tests for each parameter value in the second subspace, determine scores for the parameter values, generate parameter value combinations for the parameters in the second subspace, determine aggregate scores for the parameter value combinations, rank the parameter value combinations based on the aggregate scores, perform cluster analysis to select a high performance cluster of parameter value combinations, perform additional tests for each parameter value combination in the high performance cluster, rank the parameter value combinations based on the additional tests, and perform cluster analysis to divide the parameter value combinations into the high performance group and a low performance group (both of which are in the high performance cluster).

At block 1258, processing logic determines a first resource allocation for the first high performance group and the first low performance group using a non-linear function. Additionally, processing logic determines a second resource allocation for the second high performance group and the second low performance group using the non-linear function or an alternative non-linear function. In each case, determining the resource allocation may include determining an amount of resources to apply to the high and low performance groups as well as to each individual parameter value combination in the high and low performance groups. In an example, the first resource for the first high and low performance groups is money. For example, X amount of dollars may be allocated for a first parameter value combination, Y amount of dollars may be allocated for a second parameter value combination, and so on. The second resources for the second high and low performance groups may be impressions, exposures, or other inventory items. For example, M number of impressions may be allocated for a third parameter value combination and N number of impressions may be allocated for a fourth parameter value combination.

At block 1260, processing logic receives an option to purchase an inventory item associated with a first parameter value combination in the first subspace. The inventory item may be an ad space having a particular placement in a particular application being used by a user with particular audience segment parameter values. At block 1265, processing logic determines whether to purchase the inventory item. To make this decision, processing logic first determines whether the first parameter value combination is in the first high or low performance group. If the first parameter value combination is not in either group, then the inventory item will not be purchased. If it is in either the first high or low performance group, then processing logic determines whether the allocated amount of resources have already been spent for that parameter value combination. If so, then the inventory item will not be purchased. If there are still remaining allocated resources for that parameter value combination, then the inventory item will be purchased. If the inventory item is not purchased, the method returns to block 1260 and an option to purchase another inventory item is received. If the inventory item is purchased, the method proceeds to block 1270.

At block 1270, processing logic determines a second parameter value combination in the second subspace to allocate the inventory item to. This may include determining which parameter value combinations in the second high or low performance groups have remaining allocated resources and selecting one such parameter value combination. In one embodiment, there is overlap between parameters and parameter values in the first subspace and the second subspace. In such an embodiment, the selected parameter value combination in the second subspace has the parameter values of the first parameter value combination that are also in the second subspace.

At block 1275, processing logic then delivers creative content to an audience segment based on the first and second parameter value combinations. In an example, the first subspace is $S_1=\{A, P, D, I, B\}$, where A is a distribution medium parameter, P is a placement parameter, D is a demographics parameter, I is an interests parameter and B is a behavior parameter. In the example, the second subspace is $S_2=\{C, D, I, B\}$, where C is creative content. D may be broken into multiple demographics parameters such as age and gender. C may be broken into multiple creative content element parameters such as background, message and call to action. In this example, the first parameter value combination may be $(A_1, P_1, D_1, I_1, B_1)$, and the second parameter value combination may be $(C_1, D_1, I_1, B_1)$. Thus, the demographics, interests and behavior parameter values may overlap between the first and second parameter value combinations.

The method may proceed to block 1280, at which processing logic determines whether there is additional budget available. If additional budget is available, the method returns to block 1260. Otherwise the method ends.

Figure 13:
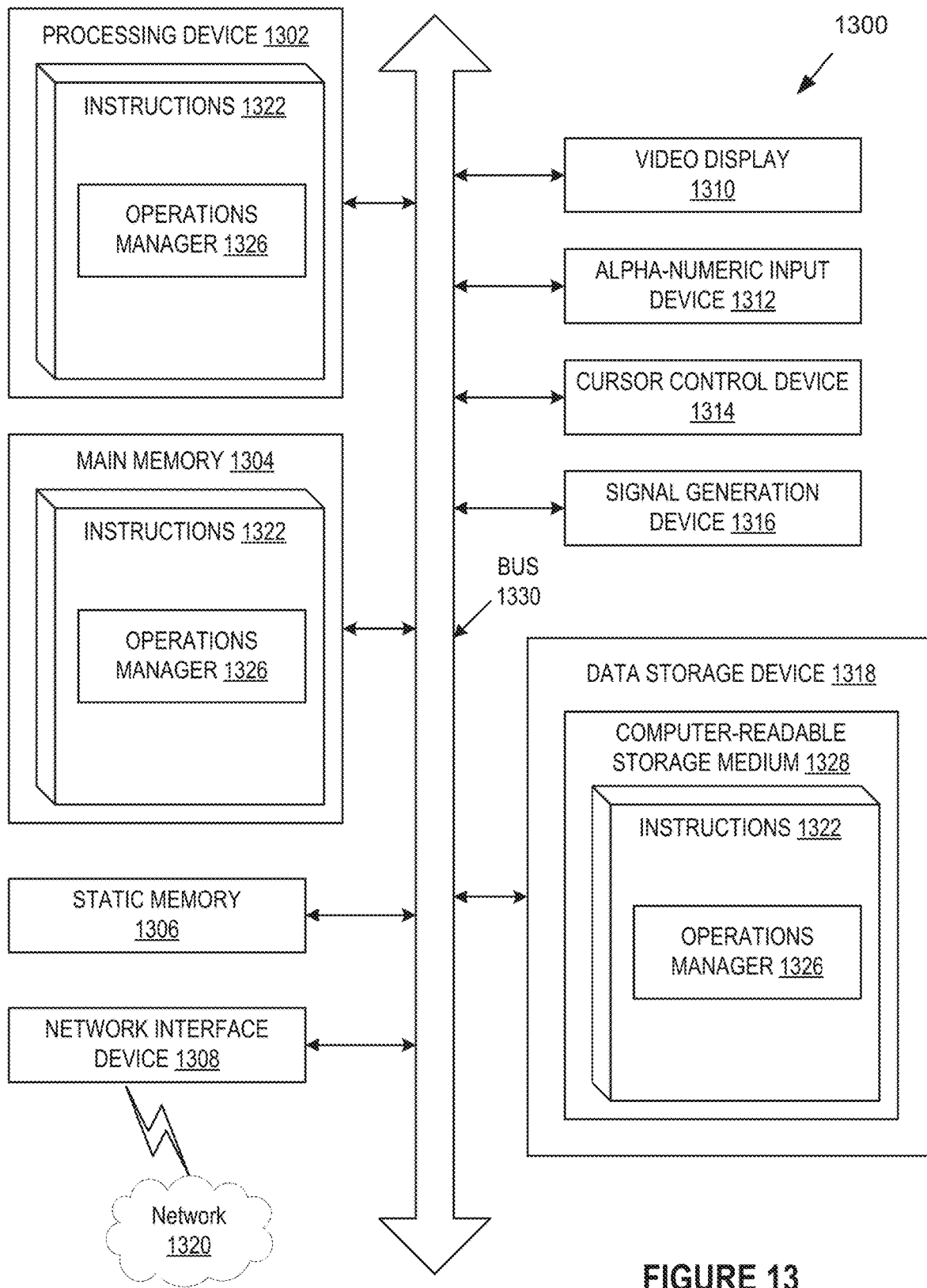
FIG. 13 illustrates a block diagram of one embodiment of a computing device.

FIG. 13 illustrates a diagrammatic representation of a machine in the example form of a computing device 1300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a secondary memory (e.g., a data storage device 1318), which communicate with each other via a bus 1330.

Processing device 1302 represents one or more general-purpose processors such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. Processing device 1302 is configured to execute the processing logic (instructions 1322) for performing the operations and steps discussed herein.

The computing device 1300 may further include a network interface device 1308. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker).

The data storage device 1318 may include a machine-readable storage medium (or more specifically a computer-readable storage medium) 1328 on which is stored one or more sets of instructions 1322 embodying any one or more of the methodologies or functions described herein. The instructions 1322 may also reside, completely or at least partially, within the main memory 1304 and/or within the processing device 1302 during execution thereof by the computer system 1300, the main memory 1304 and the processing device 1302 also constituting computer-readable storage media.

The computer-readable storage medium 1328 may also be used to store an operations manager 1326 (as described with reference to FIG. 2), and/or a software library containing methods that call an operations manager 1326. While the computer-readable storage medium 1328 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components, methods and other features described herein (for example in relation to FIGS. 1-12) can be implemented as discrete hardware components or integrated in the functionality of hardware components such as ASICS, FPGAs, DSPs or similar devices. In addition, the modules and methods can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "performing", "determining", "computing", "defining", "generating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of machine learning, comprising:
performing, by a processing device, dimensionality reduction on a parameter space based on performing the following:
performing a plurality of initial tests to determine scores for a plurality of parameter values in the parameter space, wherein performing the plurality of initial tests comprises performing one or more initial tests for each parameter value in the plurality of parameter values;
determining, based on the scores for the plurality of parameter values, aggregate scores for a plurality of parameter value combinations, wherein the aggregate score of each parameter value combination does not represent a probability that an event associated with a key performance indicator (KPI) will be achieved for each respective parameter value combination;
determining a first ranking of the plurality of parameter value combinations based on the aggregate scores, wherein the first ranking of the plurality of parameter value combinations based on the aggregate scores correlates to a second ranking of the plurality of parameter value combinations based on the probability that an event associated with a key performance indicator (KPI) will be achieved such that the first ranking mirrors the second ranking, wherein the first ranking and the second ranking represent two distinct criteria of rankings of the same plurality of parameter value combinations; and
performing cluster analysis on the plurality of parameter value combinations using the first ranking to determine a set of parameter value combinations from the plurality of parameter value combinations;
performing a plurality of additional tests, wherein each additional test of the plurality of additional tests is for a parameter value combination in the set of parameter value combinations;
computing, for each parameter value combination of the set of parameter value combinations, based on an associated additional test of the plurality of additional tests, a probability of the parameter value combination achieving the event associated with the KPI;
performing cluster analysis on the set of parameter value combinations to determine a first subset of the set of parameter value combinations having highest probabilities of achieving the event associated with the KPI; and
performing an operation for one or more parameter value combinations in the first subset.

2. The method of claim 1, wherein the plurality of parameter values comprise one or more parameter values for each parameter of a plurality of parameters that define a parameter space, and wherein the plurality of parameters comprise a plurality of audience segments and a plurality of creative content elements.

3. The method of claim 2, wherein:
the plurality of audience segments comprise a gender audience segment, an age audience segment, an interests audience segment and a behavior audience segment; and the plurality of creative content elements comprise a background image creative content element, a message creative content element, and a call to action creative content element.

4. The method of claim 2, wherein performing the operation on the one or more parameter value combinations in the first subset comprises sending creative content indicated in parameter value combinations from the first subset to audience segments indicated in corresponding parameter value combinations in the first subset.

5. The method of claim 1, wherein selecting the first subset of the set of parameter value combinations comprises:
determining a threshold probability for inclusion in the first subset; and
determining the parameter value combinations in the set of parameter value combinations that exceed the threshold probability.

6. The method of claim 5, further comprising:
grouping a remainder of the set of parameter value combinations that are not included in the first subset into a second subset of the set of parameter value combinations.

7. The method of claim 6, further comprising:
allocating a first amount of a resource to the first subset; and
allocating a second amount of the resource to the second subset.

8. The method of claim 7, further comprising:
allocating the first amount of the resource between the plurality of parameter value combinations in the first subset unequally using a non-linear function.

9. The method of claim 1, further comprising:
computing, based on results of the plurality of additional tests, for each parameter value combination of the set of parameter value combinations, a probability of a resource allocated for the parameter value combination achieving an additional event associated with an additional KPI;

determining a second ranking of the parameter value combinations in the set of parameter value combinations based on the probability of the resource allocated for the parameter value combinations achieving the additional event associated with the additional KPI; and selecting a second subset of the set of parameter value combinations based on the second ranking of the parameter value combinations.

10. The method of claim 9, further comprising:
allocating a first amount of the resource to the first subset using a non-linear function; and
allocating a second amount of the resource to the second subset using the non-linear function.

11. The method of claim 1, further comprising performing reinforcement learning based on performing the following:
sending creative content indicated in parameter value combinations from the first subset to audience segments indicated in corresponding parameter value combinations in the first subset;
computing, based on results of the sending, updated probabilities of a resource allocated for the parameter value combinations in the first subset achieving the event associated with the KPI; and
performing cluster analysis on the set of parameter value combinations to update members of the first subset.

12. The method of claim 11, further comprising:
sending additional creative content indicated in additional parameter value combinations from a second subset of the set that did not qualify for inclusion in the first subset to additional audience segments indicated in corresponding parameter value combinations in the second subset;
computing, based on results of the sending of the additional content to the additional audience segments, updated probabilities of the resource allocated for the parameter value combinations in the second subset achieving the event associated with the KPI; and
determining that a parameter value combination from the second subset should be moved to the first subset.

13. The method of claim 12, further comprising:
determining that an additional parameter value combination in the second subset has failed to satisfy a minimum performance metric for a threshold amount of time; and
moving the additional parameter value combination to a third subset, wherein parameter value combinations in the third subset are no longer used.

14. The method of claim 1, further comprising:
defining the parameter space, wherein the parameter space has a dimension that is greater than one; and
reducing the parameter space into a plurality of single dimension functions, wherein each single dimension function is for a single parameter value of the plurality of parameter values;
wherein each of the scores for the plurality of parameter values is associated with one of the single dimension functions; and
wherein one or more parameter value combinations in the first subset have the dimension of the parameter space.

15. A non-transitory computer readable medium having instructions that, when executed by a processing device, cause the processing device to perform operations comprising:

performing, by the processing device, a plurality of initial tests to determine scores for a plurality of parameter values, wherein the plurality of parameter values comprise parameter values for a plurality of audience segments and additional parameter values for a plurality of creative content elements, wherein performing the plurality of initial tests comprises performing one or more initial tests for each parameter value in the plurality of parameter values;

determining, by the processing device and based on the scores for the plurality of parameter values, aggregate scores for a plurality of parameter value combinations;

determining a first ranking of the plurality of parameter value combinations based on the aggregate scores, wherein the first ranking of the plurality of parameter value combinations based on the aggregate scores correlates to a second ranking of the plurality of parameter value combinations based on a probability that an event associated with a key performance indicator (KPI) will be achieved such that the first ranking mirrors the second ranking, wherein the first ranking and the second ranking represent two distinct criteria of rankings of the same plurality of parameter value combinations;

selecting, by the processing device, a set of parameter value combinations having highest ranking based on the aggregate scores from the plurality of parameter value combinations;

performing a plurality of additional tests, wherein each additional test of the plurality of additional tests is for a parameter value combination in the set of parameter value combinations;

computing, for each parameter value combination of the set of parameter value combinations, based on an associated additional test of the plurality of additional tests, a probability of the parameter value combination achieving an event associated with a key performance indicator (KPI);

selecting, by the processing device, a first subset of the set of parameter value combinations having highest probabilities of achieving the event associated with the KPI;

grouping a remainder of the set of parameter value combinations that are not included in the first subset into a second subset of the set of parameter value combinations, wherein the first subset and the second subset make up the entire set; and sending creative content indicated in one or more parameter value combinations from the first subset to audience segments indicated in corresponding parameter value combinations in the first subset.

16. The non-transitory computer readable medium of claim 15, wherein selecting the first subset of the set of parameter value combinations comprises:
determining a threshold probability for inclusion in the first subset; and
determining the parameter value combinations in the set of parameter value combinations that exceed the threshold probability.

17. The non-transitory computer readable medium of claim 16, the operations further comprising:
allocating a first amount of a resource to the first subset using a non-linear function; and
allocating a second amount of the resource to the second subset using the non-linear function.

18. The non-transitory computer readable medium of claim 17, the operations further comprising:

allocating the first amount of the resource between the plurality of parameter value combinations in the first subset unequally using the non-linear function or an additional non-linear function.

19. The non-transitory computer readable medium of claim 15, the operations further comprising:
computing, based on results of the plurality of additional tests, for each parameter value combination of the set of parameter value combinations, a probability of a resource allocated for the parameter value combination achieving an additional event associated with an additional KPI;
determining a third ranking of the parameter value combinations in the set of parameter value combinations based on the probability of the resource allocated for the parameter value combinations achieving the additional event associated with the additional KPI; and
selecting a second subset of the set of parameter value combinations based on the third ranking of the parameter value combinations.

20. The non-transitory computer readable medium of claim 15, the operations further comprising:
sending creative content indicated in parameter value combinations from the first subset to audience segments indicated in corresponding parameter value combinations in the first subset;
computing, based on results of the sending, updated probabilities of a resource allocated for the parameter value combinations in the first subset achieving the event associated with the KPI; and
updating members of the first subset.

21. The non-transitory computer readable medium of claim 15, the operations further comprising:
sending additional creative content indicated in additional parameter value combinations from a second subset of the set that did not qualify for inclusion in the first subset to additional audience segments indicated in corresponding parameter value combinations in the second subset;
computing, based on results of the sending of the additional content to the additional audience segments, updated probabilities of a resource allocated for the parameter value combinations in the second subset achieving the event associated with the KPI; and
determining that a parameter value combination from the second subset should be moved to the first subset.

22. The non-transitory computer readable medium of claim 21, the operations further comprising:
determining that an additional parameter value combination in the second subset has failed to satisfy a minimum performance metric for a threshold amount of time; and
moving the additional parameter value combination to a third subset, wherein parameter value combinations in the third subset are no longer used.

23. A method comprising:
dividing, by a processing device, a parameter space comprising a plurality of parameters into a first subspace comprising a first plurality of parameter value combinations for a first subset of the plurality of parameters and a second subspace comprising a second plurality of parameter value combinations for a second subset of the plurality of parameters, wherein the first subspace and the second subspace share at least one of the plurality of parameters;
determining, by the processing device, a first subset of the first plurality of parameter value combinations for the first subspace by determining a first ranking of the first plurality of parameter value combinations based on aggregate scores of each parameter value combination, wherein the first ranking of the first plurality of parameter value combinations based on the aggregate scores correlates to a second ranking of the first plurality of parameter value combinations based on a probability that an event associated with a key performance indicator (KPI) will be achieved such that the first ranking mirrors the second ranking, wherein the first ranking and the second ranking represent two distinct criteria of rankings of the same plurality of parameter value combinations;
determining, by the processing device, a second subset of the second plurality of parameter value combinations for the second subspace;
determining a first resource allocation for the first subset and a second resource allocation for the second subset;
receiving an option for an item associated with a first parameter value combination in the first subset;
determining, by the processing device, to expend a resource to exercise the option for the item based on the first resource allocation;
determining, by the processing device, a second parameter value combination in the second subset to allocate for the item, wherein the second parameter value combination overlaps with the first parameter value combination by at least one parameter value; and
performing an operation for a composite parameter value combination that comprises the first parameter value combination and the second parameter value combination.

24. The method of claim 23, wherein:
the parameter space comprises a distribution medium parameter, a placement parameter, a plurality of audience segment parameters and a plurality of creative content element parameters;
the first subspace comprises the distribution medium parameter, the placement parameter and the plurality of audience segment parameters; and
the second subspace comprises the plurality of audience segment parameters and the plurality of creative content element parameters.

25. The method of claim 23, wherein determining the first subset for the first subspace further comprises:
performing dimensionality reduction on the first subspace based on performing the following:
performing a plurality of initial tests to determine scores for a plurality of parameter values in the first subspace, wherein performing the plurality of initial tests comprises performing one or more initial tests for each parameter value in the plurality of parameter values;
determining, based on the scores for the plurality of parameter values, aggregate scores for the first plurality of parameter value combinations, wherein the aggregate score of each parameter value combination does not represent a probability that an event associated with a key performance indicator (KPI) will be achieved for each respective parameter value combination;
performing cluster analysis on the first plurality of parameter value combinations using the first ranking to determine a first set of parameter value combinations from the first plurality of parameter value combinations;

performing a plurality of additional tests, wherein each additional test of the plurality of additional tests is for a parameter value combination in the first set of parameter value combinations;

computing, for each parameter value combination of the first set of parameter value combinations, based on an associated additional test of the plurality of additional tests, a probability of the parameter value combination achieving the event associated with the KPI; and performing cluster analysis on the first set of parameter value combinations to determine the first subset, wherein the first subset comprises parameter value combinations from the first set having highest probabilities of achieving the event associated with the KPI.

26. The method of claim 23, wherein determining the second subset for the second subspace comprises:

performing dimensionality reduction on the second subspace based on one or more first tests of individual parameter values to determine a second set of the second plurality of parameter value combinations;

performing a plurality of additional tests, wherein each additional test of the plurality of additional tests is for a parameter value combination in the second set of parameter value combinations;

computing, for each parameter value combination of the second set of parameter value combinations, based on an associated additional test of the plurality of additional tests, a probability of the parameter value combination achieving an event associated with a key performance indicator (KPI); and performing cluster analysis on the second set of parameter value combinations to determine the second subset, wherein the second subset comprises parameter value combinations from the second set having highest probabilities of achieving the event associated with the KPI.

* * * * *